(12) United States Patent
Ballentine et al.

(10) Patent No.: US 12,218,624 B2
(45) Date of Patent: Feb. 4, 2025

(54) SOLAR TRACKER ASSEMBLY WITH CONCENTRIC DRIVE JOURNALS

(71) Applicant: OMCO SOLAR, LLC, Phoenix, AZ (US)

(72) Inventors: Andrew James Ballentine, Tempe, AZ (US); David J. Wilson, Glendale, AZ (US); Matt Kesler, Phoenix, AZ (US)

(73) Assignee: OMCO SOLAR, LLC, Phoenix, AZ (US)

( * ) Notice: Subject to any disclaimer, the term of this patent is extended or adjusted under 35 U.S.C. 154(b) by 0 days.

(21) Appl. No.: 18/087,414

(22) Filed: Dec. 22, 2022

(65) Prior Publication Data

US 2023/0208348 A1 Jun. 29, 2023

Related U.S. Application Data

(60) Provisional application No. 63/293,585, filed on Dec. 23, 2021.

(51) Int. Cl.
*H02S 20/32* (2014.01)

(52) U.S. Cl.
CPC ..................... *H02S 20/32* (2014.12)

(58) Field of Classification Search
CPC ....................................................... H02S 20/32
See application file for complete search history.

(56) References Cited

U.S. PATENT DOCUMENTS

| 3,252,192 | A | 5/1966 | Smith |
| 3,713,714 | A | 1/1973 | Hill |
| 3,999,389 | A | 12/1976 | Bryce |
| 4,100,915 | A | 7/1978 | Carlson |
| 4,205,657 | A | 6/1980 | Kelly |
| 4,243,018 | A | 1/1981 | Hubbard |
| 4,696,285 | A | 9/1987 | Zwach |
| 5,161,828 | A | 11/1992 | Hynes et al. |
| 6,347,489 | B1 | 2/2002 | Marshall, Jr. et al. |
| 6,775,890 | B2 | 8/2004 | Kolarik |
| 7,219,934 | B2 | 5/2007 | McMahon |
| 7,384,076 | B2 | 6/2008 | Bradley |
| 7,677,242 | B2 | 3/2010 | Carcangiu et al. |
| 7,884,308 | B1 | 2/2011 | Meja |
| 8,052,100 | B2 | 11/2011 | Zante et al. |

(Continued)

FOREIGN PATENT DOCUMENTS

WO   WO 2018/167643 A1   9/2018

*Primary Examiner* — Jayne L Mershon

(57) ABSTRACT

A solar tracker assembly including a drive mechanism including a rotating drive rotatable about a drive mechanism axis of rotation and a table pivoted by the rotating drive. The table includes first and second torque tube beam segments; first and second drive journals affixed to opposite sides of the rotating drive, longitudinal center lines of the drive journals coincident with the drive mechanism axis of rotation. The table further includes first and second bearings, an end of the first torque tube beam segment coupled to the first bearing to rotate about the first bearing axis of rotation and an end of the second torque tube beam segment coupled the second bearing to rotate about the second bearing axis of rotation. The first and second bearing axes of rotation are vertically offset from the longitudinal center lines of the first and second drive journals and the drive mechanism axis of rotation.

23 Claims, 6 Drawing Sheets

(56) References Cited

U.S. PATENT DOCUMENTS

| | | |
|---|---|---|
| 8,161,962 B2 | 4/2012 | Kuo |
| 8,267,359 B2 | 9/2012 | Zante et al. |
| 8,763,601 B2 | 7/2014 | Doyle |
| 8,939,648 B2 | 1/2015 | Schneider et al. |
| 9,163,760 B2 | 10/2015 | Lundstrom et al. |
| 9,281,778 B2 | 3/2016 | Corio et al. |
| 9,466,749 B1 | 10/2016 | Au |
| 9,554,761 B2 | 1/2017 | Baumann |
| D793,848 S | 8/2017 | Charette |
| 9,806,669 B2 | 10/2017 | De Welle |
| 9,808,893 B2 | 11/2017 | McClure |
| 9,970,686 B2 | 5/2018 | Au |
| 10,256,768 B2 | 4/2019 | Owen et al. |
| 10,557,646 B1 | 2/2020 | Ma et al. |
| 10,917,037 B2 | 2/2021 | Remy |
| 11,043,607 B2 | 6/2021 | Au |
| 11,101,768 B2 | 8/2021 | Liu et al. |
| 11,300,979 B2 | 4/2022 | Kesler et al. |
| 2002/0078945 A1 | 6/2002 | Funger et al. |
| 2009/0256046 A1 | 10/2009 | Hausner et al. |
| 2009/0314280 A1 | 12/2009 | Banerjee |
| 2010/0058703 A1 | 3/2010 | Werner et al. |
| 2010/0139646 A1 | 6/2010 | Barsun et al. |
| 2010/0275975 A1 | 11/2010 | Monschke et al. |
| 2011/0162692 A1 | 7/2011 | Giacalone et al. |
| 2011/0253195 A1 | 10/2011 | Kim |
| 2012/0031488 A1 | 2/2012 | Kaufman et al. |
| 2012/0152308 A1 | 6/2012 | Miller et al. |
| 2012/0152312 A1 | 6/2012 | Miller et al. |
| 2012/0180845 A1 | 7/2012 | Cole et al. |
| 2015/0222218 A1 | 8/2015 | Koyama |
| 2016/0261225 A1 | 9/2016 | Paponneau |
| 2017/0051782 A1 | 2/2017 | Jones et al. |
| 2017/0102168 A1 | 4/2017 | Childress |
| 2017/0234580 A1 | 8/2017 | Worden |
| 2019/0226520 A1 | 7/2019 | Forder et al. |
| 2019/0379323 A1 | 12/2019 | Au et al. |
| 2020/0052643 A1* | 2/2020 | Ballentine ............... F16M 11/10 |
| 2020/0052644 A1* | 2/2020 | Taha ...................... F24S 30/425 |
| 2020/0032934 A1 | 12/2020 | Belen et al. |
| 2021/0194418 A1 | 6/2021 | Ballentine et al. |
| 2022/0308599 A1* | 9/2022 | Wang .................... G05D 3/105 |

\* cited by examiner

SOLAR TRACKER ASSEMBLY WITH CONCENTRIC DRIVE JOURNALS

CROSS REFERENCE TO RELATED APPLICATIONS

The following application claims priority under 35 U.S.C. § 119(e) to U.S. Provisional Patent Application Ser. No. 63/293,585, filed Dec. 23, 2021, entitled Solar Tracker Assembly With Concentric Drive Journals. The above-identified U.S. provisional patent application is incorporated by reference herein in its entirety for any and all purposes.

TECHNICAL FIELD

The present disclosure relates to a solar tracker assembly including first and second drive journals affixed to opposite sides of a rotating or rotatable drive of a drive mechanism, the rotating drive rotating about a drive mechanism axis of rotation and pivoting a table of the solar tracker assembly coupled to the rotating drive, the first and second drive journals including respective first and second receivers for receiving respective first end portions of first and second torque tube beam segments, a longitudinal center line of each of the first and second receivers being coincident with the drive mechanism axis of rotation, respective second end portions of each of the torque tube beam segments pivotally supported by first and second bearing assemblies, the first bearing assembly pivoting about a first axis of rotation and the second bearing assembly pivoting about a second axis of rotation, the first bearing assembly axis of rotation and the second bearing assembly axis of rotation being vertically offset from the longitudinal center lines of the first and second drive journals and the drive mechanism axis of rotation.

BACKGROUND

Various types of solar tracker systems are known including a horizontal, single axis solar tracker systems or assemblies. Solar tracker systems or assemblies are interchangeably referred to in the industry as solar tracker systems, solar tracker assemblies, solar tracker apparatuses, solar tracking systems, solar tracking assemblies, or solar tracking apparatuses, and such terms are understood to be interchangeable throughout. A single row, horizontal, single axis solar tracker assembly typically includes a torque tube beam and a plurality of photovoltaic modules, sometimes referred to as solar modules or panels. The plurality of photovoltaic modules is coupled to the torque tube beam via a frame which includes various components including mounting brackets, clamps and fasteners. The torque tube beam is typically comprised of one or more torque tube beam segments. When multiple torque tube beam segments are utilized, they may be affixed in a linear fashion by couplers or splicing members which couple together end portions of adjacent torque tube beam segments. The torque tube beam is generally horizontal in that the torque tube beam extends parallel to the ground. Of course, it should be appreciated that the ground, that is, the land, terrain or substrate, may undulate over the length or longitudinal extent of the torque tube beam, thus, when it is stated that the torque tube beam is horizontal, it means that the beam is generally parallel to or follows the contours of the ground/terrain/substrate that the torque tube beam extends along. The torque tube beam may be comprised of a plurality of torque tube beam segments of predetermined length, i.e., 40-foot segments.

The modules of the plurality of photovoltaic modules are typically spaced uniformly along the torque tube beam by the frame mounting brackets. The solar tracker system includes a pivoting table which is pivoted about an axis of rotation by a drive mechanism or drive actuator. The table includes everything that pivots or swings about the axis of rotation of the table. The table of a solar tracking system or assembly typically includes: a) the torque tube beam including a plurality of torque tube beam segments; b) the plurality of photovoltaic modules; c) the movable or pivoting portions of a plurality of solar tracking bearing apparatuses that support the torque tube beam along its length and pivot the torque tube beam about the axis of rotation of the table; and d) the frame which affixes or secures the plurality of photovoltaic modules to the torque tube beam. The frame typically includes a number of mounting brackets. Mounting bracket components may include components which extend orthogonal to a longitudinal extent of the torque tube beam such as, for example, module rails, and may include components which extend parallel to the longitudinal extent of the torque tube beam such as, for example, support arms. The plurality of mounting bracket assemblies support and secure the plurality of photovoltaic modules to the torque tube beam. In addition to modules rails and support arms, a mounting bracket assembly may include other components such as, for example, clamps, connectors and/or fasteners for securing the plurality of photovoltaic modules to the frame and thereby affixing the plurality of photovoltaic modules to the torque tube beam. Suitable mounting brackets for a single axis solar tracker system is disclosed in U.S. Pat. No. 11,271,518 to Ballentine et al., issued Mar. 8, 2022, and assigned to the assignee of the present application. The '518 patent is incorporated by reference herein in its entirety.

The axis of rotation of the table of the solar tracker system extends parallel to the torque tube beam and is defined by the axes of rotation of pivoting or rotatable portions of a plurality of solar tracker bearing apparatuses which support the torque tube beam at spaced apart intervals along the length of the torque tube beam. A suitable solar tracker bearing apparatus for a single axis solar tracker system is disclosed in U.S. Pat. No. 10,944,354 to Ballentine et al., issued Mar. 9, 2021, and assigned to the assignee of the present application. The '354 patent is incorporated by reference herein in its entirety. Thus, typically, the aligned axes of rotation of the plurality of solar tracking bearing apparatuses define the axis of rotation of the solar tracker table. A solar tracking system may comprise a single row layout, i.e., a solar tracker assembly including a single torque tube beam extending in a north-south direction or, in larger scale solar energy production installations, the solar tracking system may comprise an array of solar tracker assemblies comprised of multiple parallel rows of solar tracking assemblies, that is, an array including multiple, spaced apart, parallel rows of torque tube beams, each extending in a north-south direction.

An extent of the table of a single row, horizontal, single axis solar tracker system or solar tracking assembly extends in two dimensions, length, generally perpendicular to the path or arc of the sun in the sky, and width, generally parallel to the path of sun in the sky. A drive or actuator mechanism, such as a slew drive or linear actuator, operating under the direction of a controller, is coupled to the torque tube beam to pivot or swing the torque tube beam about the table axis of rotation to change an angle of inclination of the frame and thereby adjust an orientation of the light receiving surfaces of the plurality of photovoltaic modules to track the movement of the sun across the sky so that the plurality of photovoltaic modules are maximally exposed to the sun throughout the day. That is, the goal of the solar tracker assembly is to move or pivot the table about the table axis of rotation such that the light receiving surfaces of the photovoltaic modules are generally orthogonal to the position of the sun, within, of course, the limits of the angle of inclination range of the table of the solar tracking assembly. The angle of inclination has a predetermined range, and the controller provides signals to the actuator mechanism to pivot the solar tracker assembly table, such that the plurality of photovoltaic modules receive optimal sunlight exposure as the sun moves across the sky. When the sun is at its apex (high noon), the table would be pivoted such that the plurality of photovoltaic panels would typically be in a horizontal position for maximum sun exposure. This would correspond to a neutral position or zero angle of inclination of the table. At dawn and at dusk, typically the table would be pivoted to maximum angles of inclination on either side of the neutral position, i.e., a maximum positive inclination angle at dawn and a maximum negative inclination angle at dusk.

In one typical embodiment of a single row, horizontal, single axis solar tracker assembly, the torque tube beam extends horizontally along the length of the table and, to achieve a proper balance, a plurality of photovoltaic modules are positioned such that that a total weight of the frame, including the plurality of photovoltaic modules and associated mounting components (e.g., module rails, clamps, brackets and fasteners), is approximately equally distributed on either side of the torque tube beam, as viewed in top plan view. A typical photovoltaic module in 1 meter wide by two meters long. In a so-called "one-in-portrait" orientation or configuration, a single row of photovoltaic modules is positioned above the torque tube beam such that the short sides of the photovoltaic modules extend parallel to the longitudinal extent of the torque tube beam, while the longer sides of the photovoltaic modules extend transversely to the torque tube beam. That is, in a portrait orientation of the plurality of photovoltaic modules, each module may be centered over the torque tube beam such that the shorter sides or extents, that is, the one meter sides, extend along the length of the torque tube beam, while the two meter sides, that is, the longer two meter sides, straddle the torque tube beam. When viewed in top plan view, one meter of the module is on one side of the torque tube beam and one meter of the module is on the opposite side of the torque tube beam such that each module is centered on the torque beam to achieve substantially equal weight balance on either side of the torque tube beam. Depending upon the characteristics and parameters of the solar tracker system, desired energy output and terrain, other configurations of the plurality of photovoltaic modules are possible including "one-in-landscape" wherein a single row of photovoltaic modules is positioned over the torque tube beam with the longer sides of the modules extending along the longitudinal extent of the torque tube beam, "two-in-landscape" wherein two rows of photovoltaic modules in landscape orientation are positioned either above or on opposite sides of the torque tube beam, the two rows of modules, when viewed in top plan view, achieving a weight balance on either side of the torque tube beam.

In a single row, horizontal, single axis solar tracker assembly, a slew drive or slew gear drive is typically approximately centered along the length of the torque tube beam. First and second drive journals are affixed to opposite sides of a driven, rotating or rotatable member of the slew drive, which rotates about a drive mechanism axis of rotation. A first portion of the torque tube beam is affixed to and extends from the first drive journal on one side of the rotating member of the slew drive and a second portion of the torque tube beam is affixed to and extends from the second drive journal on the opposite side of the rotating member of the slew drive. For example, the first portion of the torque tube beam may extend north from the slew drive and may be comprised of five, 40-foot torque tube beam segments, while the second portion of the torque tube beam may extend south from the slew drive and may similarly be comprised of five, 40-foot torque tube beam segments, thus providing a total north-south extent or length of the torque tube beam of 400 feet. Couplers or splicing members are used between adjacent torque tube beam segments to splice end portions of the two adjacent torque tube beam segments together. The rotating or rotatable member of the slew drive pivots or rotates the first and second drive journals affixed to opposite sides of the rotational drive and thereby pivots the torque tube beam segment and the components of the table. For example, an end portion of a first torque tube beam segment adjacent the first drive journal is affixed to the first drive journal which, in turn, is affixed to the first side of the rotating member of the slew drive. Similarly, an end portion of a second torque tube beam segment adjacent the second drive journal is affixed to the second drive journal which, in turn, is affixed to the second side of the rotating member of the slew drive.

It should be understood that actuators or drive mechanisms other than a slew drive may be used to pivot the table, for example, one or more electrical linear actuators may be used to pivot the table of the solar tracking system in place of one or more slew gear drives. In a solar tracking system or assembly that includes an array of multiple, spaced apart, parallel rows of torque tube beams, each extending in a north-south direction, each row may include an independent slew drive coupled to the torque tube beam to pivot the table. Alternately, the torque tube beams of multiple rows may be mechanically coupled such that a single, larger slew drive, or another type of drive, may be used to pivot the respective tables of the multiple rows in unison.

As mentioned previously, the torque tube beam and thus the table is supported for pivoting movement about the axis of rotation of the table by the plurality of solar tracker bearing apparatuses. Each of the solar tracker bearing apparatuses are affixed to a respective one of a plurality of spaced apart upright support posts which are anchored to or anchored in a substrate, such as the ground. The upright support posts are stationary and support the plurality of solar tracker bearing apparatuses, which, in turn, pivotally support the frame and the plurality of photovoltaic modules. Typically, one solar tracker bearing apparatus is mounted or coupled to each upright support post. Each solar tracker bearing apparatus includes a stationary member, affixed to a support post, and a rotating or rotatable member or assembly supporting the torque tube beam, which rotates about the bearing axis of rotation. Additionally, the slew drive is also mounted to its own support post.

The plurality of solar tracker bearing apparatuses pivotally support the torque tube beam for movement or pivoting about the table axis of rotation. The actuator or drive mechanism, i.e., the slew drive or linear actuator, coupled to the torque tube beam and operating under the control of a controller, provides the motive force to pivot the table about the axis of rotation and thus change the angle of inclination of the table. The plurality of solar tracker bearing apparatuses rotatably disposed between the torque tube beam and the upright support posts permit the torque tube beam to pivot with respect to the upright support posts and thereby allows the angle of inclination of the table to be changed by the slew drive such that the plurality of photovoltaic modules is maximally exposed to the sun within the range of the angle of inclination of the solar tracking system.

In some prior single row, horizontal, single axis solar tracker assemblies, because the plurality of photovoltaic modules is mounted vertically above the torque tube beam, a center of mass or center of gravity of the table is vertically above a longitudinal center line through the torque tube beam and, indeed, may be vertically above an upper wall of the torque tube beam. One approach to reduce the torque required to pivot the table is to position and configure the plurality of bearing apparatuses such that the axis of rotation of the table, as defined by the vertically aligned axes of rotation of the plurality of bearing apparatuses, passes through the center of gravity of the table. This configuration requires the plurality of bearing apparatuses to swing or pivot the torque tube beam in an arcuate path about the desired table axis of rotation. End portions of the torque tube beam segments adjacent the slew drive are received by the first and second drive journals and coupled to opposite sides of the rotating drive or rotating drive member of the slew drive. In order to have the end portions of the torque tube beam segments pivot about the desired table axis of rotation required a radial offset by the first and second drive journals between the end portions of the torque tube beam segments adjacent the slew drive and the axis of rotation of the rotating drive of the slew drive. That is, the first and second drive journals had to be configured to provide a radial offset between the axis of rotation of the slew drive and the end portions of the torque tube beam segments received by the first and second drive journals. Unfortunately, utilizing first and second drive journals with a radial offset between the axis of rotation of the rotating drive of the slew drive presented a number of issues including increasing the torque requirements of the slew drive due to the radial offset. This, in turn, required either utilization of a larger capacity slew drive or the use of multiple slew drives along the torque tube beam, both of which are undesirable both from a cost and an engineering complexity point of view.

SUMMARY

In one aspect, the present disclosure relates to solar tracker assembly comprising: a) a drive mechanism including a rotating drive rotating about a drive mechanism axis of rotation, the rotating drive including a first side and a second side; b) a table coupled to the rotating drive and pivoted by the rotating drive through a predetermined inclination angle range, the table including: i) a first torque tube beam segment extending along a first central longitudinal axis and having a first end portion and a second end portion spaced apart by a middle portion, a second torque tube beam segment extending along a second central longitudinal axis and having a first end portion and a second end portion spaced apart by a middle portion; ii) a first drive journal affixed to the first side of the rotating drive and a second drive journal affixed to the second side of the rotating drive, the first drive journal including a first receiver extending along a first longitudinal center line and receiving the first end portion of the first torque tube beam segment and the second drive journal including a second receiver extending along a second longitudinal center line and receiving the first end portion of the second torque tube beam segment, the first longitudinal center line of the first drive journal substantially coincident with the drive mechanism axis of rotation and the second longitudinal center line of the second drive journal substantially coincident with the drive mechanism axis of rotation, the first end portion of the first torque tube beam segment and the first end portion of the second torque tube beam segment rotating about the drive mechanism axis of rotation; and iii) a first rotatable bearing assembly of a first bearing apparatus supported for rotation about a first bearing axis of rotation and a second rotatable bearing assembly of a second bearing apparatus supported for rotation about a second bearing axis of rotation, the second end portion of the first torque tube beam segment coupled to the first rotatable bearing assembly and rotating about the first bearing axis of rotation and the second end portion of the second torque tube beam segment coupled to the second rotatable bearing assembly and rotating about the second bearing axis of rotation; and c) wherein the first bearing axis of rotation is vertically offset from the longitudinal center line of the first drive journal and the drive mechanism axis of rotation and the second bearing axis of rotation is vertically offset from the longitudinal center line of the second drive journal and the drive mechanism axis of rotation.

In another aspect, the present disclosure relates to a solar tracker assembly comprising: a) a drive mechanism including a rotating drive rotating about a drive mechanism axis of rotation, the rotating drive including a first side and a second side; b) a table coupled to the rotating drive and pivoted by the rotating drive through an inclination angle range, the table including: i) a first torque tube beam segment extending along a first central longitudinal axis and having a first end portion and a second end portion spaced apart by a middle portion, a second torque tube beam segment extending along a second central longitudinal axis and having a first end portion and a second portion spaced apart by a middle portion; ii) a first drive journal affixed to a first side of the rotating drive and a second drive journal affixed to a second side of the rotating drive, the first drive journal including a first receiver receiving and securing the first end portion of the first torque tube beam segment and the second drive journal including a second receiver receiving and securing the first end portion of the second torque tube beam segment, the first receiver extending along a first longitudinal center line of the first drive journal that is substantially coincident with the drive mechanism axis of rotation and the second receiver extending along a second longitudinal center line of the second drive journal that is substantially coincident with the drive mechanism axis of rotation, the first end portion of the first torque tube beam segment and the first end portion of the second torque tube beam segment rotating about the drive mechanism axis of rotation; and iii) a first rotatable bearing assembly of a first bearing apparatus supported for rotation about a first bearing axis of rotation and a second bearing assembly of a second bearing apparatus supported for rotation about a second bearing axis of rotation, the second end portion of the first torque tube beam segment affixed to the first rotatable bearing assembly and rotating about the first bearing apparatus axis of rotation and the second end portion of the second torque tube beam segment affixed to the second rotatable bearing assembly and rotating about the second bearing axis of rotation; and c) wherein a portion of the first central longitudinal axis of the first torque tube beam segment in a region of the second end portion of the first torque tube beam segment is vertically offset from a portion of the first central longitudinal axis of the first torque tube beam segment in a region of the first end portion of the first torque tube beam and is vertically offset from the drive mechanism axis of rotation and further wherein a portion of the second central longitudinal axis of the second torque tube beam segment in a region of the second end portion of the second torque tube beam segment is vertically offset from a portion of the second central longitudinal axis of the second torque tube beam segment in a region of the first end portion of the second torque tube beam and is vertically offset from the drive mechanism axis of rotation.

In another aspect, the present disclosure relates to a solar tracker assembly comprising: a) a drive mechanism including a rotating drive rotating about a drive mechanism axis of rotation, the rotating drive including a first side; b) a table coupled to the rotating drive and pivoted by the rotating drive through a predetermined inclination angle range, the table including: i) a first torque tube beam segment extending along a first central longitudinal axis and having a first end portion and a spaced apart second end portion; ii) a first drive journal affixed to the first side of the rotating drive, the first drive journal including a first receiver extending along a first longitudinal center line and receiving the first end portion of the first torque tube beam segment, the first longitudinal center line of the first drive journal substantially coincident with the drive mechanism axis of rotation, the first end of the portion of the first torque tube beam segment rotating about the drive mechanism axis of rotation; and iii) a first rotatable bearing assembly of a first bearing apparatus supported for rotation about a first bearing axis of rotation, the second end portion of the first torque tube beam segment coupled to the first rotatable bearing assembly and rotating about the first bearing axis of rotation; and c) wherein the first bearing axis of rotation is vertically offset from the longitudinal center line of the first drive journal and the drive mechanism axis of rotation.

In another aspect, the present disclosure relates to a concentric drive configuration for solar tracker assembly, the concentric drive configuration pivoting a table of the solar tracker assembly through a predetermined inclination angle range, the concentric drive configuration comprising: a) a drive mechanism including a rotating drive rotating about a drive mechanism axis of rotation, the rotating drive including a first side; b) a first torque tube beam segment extending along a first central longitudinal axis and having a first end portion and a spaced apart second end portion; c) a first drive journal affixed to the first side of the rotating drive, the first drive journal including a first receiver extending along a first longitudinal center line and receiving the first end portion of the first torque tube beam segment, the first longitudinal center line of the first drive journal substantially coincident with the drive mechanism axis of rotation, the first end of the portion of the first torque tube beam segment rotating about the drive mechanism axis of rotation; d) a first rotatable bearing assembly of a first bearing apparatus supported for rotation about a first bearing axis of rotation, the second end portion of the first torque tube beam segment coupled to the first rotatable bearing assembly and rotating about the first bearing axis of rotation; and e) wherein the first bearing axis of rotation is vertically offset from the longitudinal center line of the first drive journal and the drive mechanism axis of rotation

BRIEF DESCRIPTION OF THE DRAWINGS

The foregoing and other features and advantages of the present disclosure will become apparent to one skilled in the art to which the present disclosure relates upon consideration of the following description of the disclosure with reference to the accompanying drawings, wherein like reference numerals, unless otherwise described refer to like parts throughout the drawings and in which.

DETAILED DESCRIPTION

Figure 1:
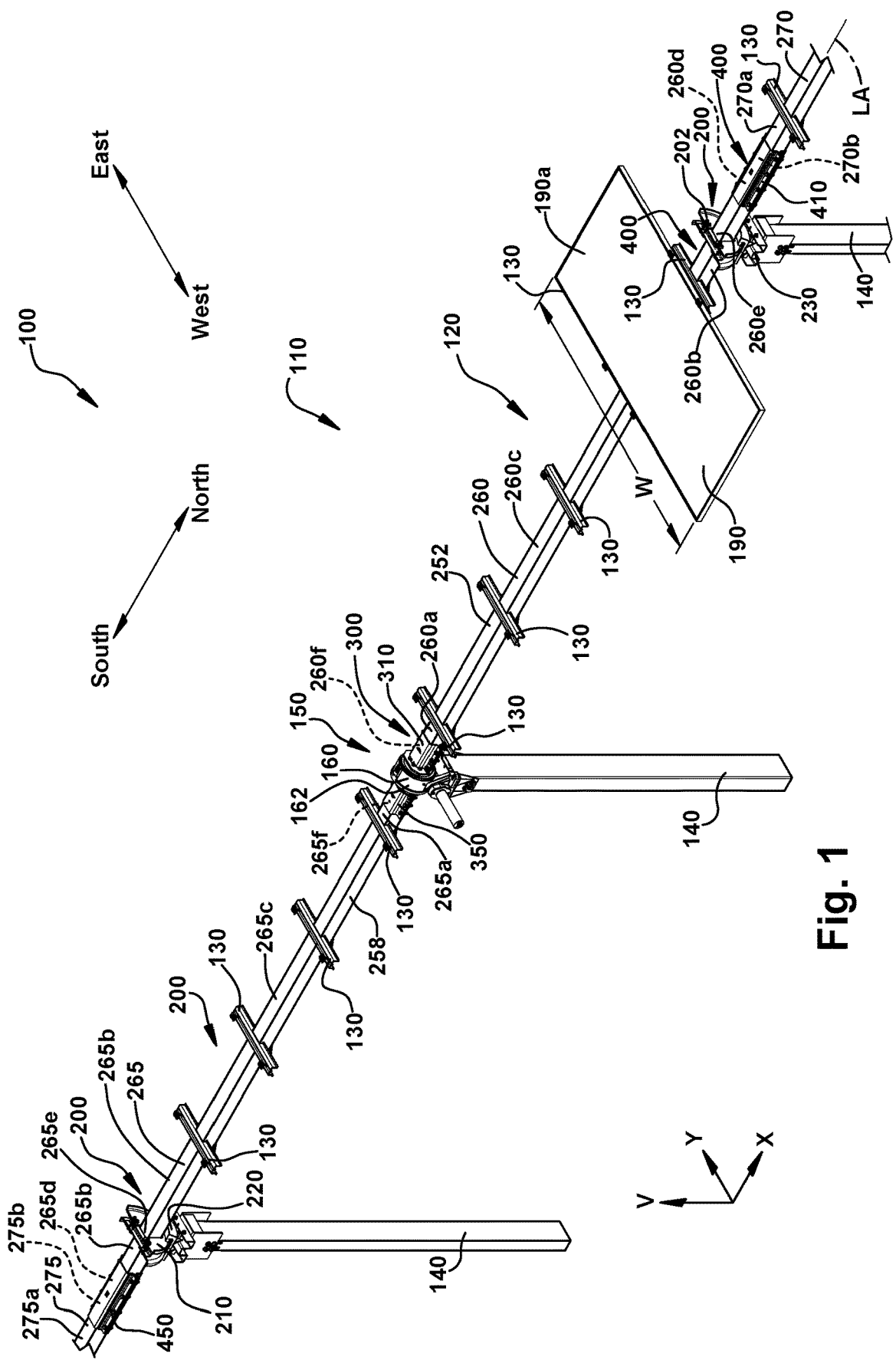
FIG. 1 is a schematic top perspective view of a portion of a single row, horizontal, single axis solar tracker system or assembly of the present disclosure, the solar tracker assembly including a drive mechanism and a pivoting table, the table including a torque tube beam including a plurality of torque tube beam segments, a frame for supporting a plurality of photovoltaic modules and a plurality of bearing apparatus for rotatably supporting the torque tube beam, for simplicity and to facilitate viewing of other components of the solar tracker assembly, only a single representative photovoltaic module of the plurality of photovoltaic modules of the solar tracker assembly supported by the frame is depicted in FIG. 1 and only certain components of the frame are depicted in FIG. 1.

The present disclosure relates to a single axis solar tracker assembly 100 (also interchangeably referred to herein as a solar tracker system, a solar tracker apparatus, a solar tracking assembly, a solar tracking system, or a solar tracking apparatus) and, more specifically, to two concentric drive configurations for the solar tracker assembly 100 that utilize an in-line drive mechanism 150 to rotate a table 110 of the solar tracker assembly 100 about a table axis of rotation R. The table 110 of the solar tracker assembly 100 includes a frame 120 supporting a plurality of photovoltaic modules 190. A rotatable torque tube beam 250 of the table 110, in turn, supports the frame 120. A plurality of bearing apparatuses 200, in turn, rotatably support the torque tube beam 250. The torque tube beam 250 is comprised of a plurality of aligned and couple torque tube beam segments. In the drawings, four torque tube beam segments, namely, first, second, third and fourth torque tube beam segments 260, 265, 270, 275 of the torque tube beam 250 are schematically depicted, it being understood that the solar tracker assembly 100 includes additional torque tube beam segments not shown. The plurality of bearing apparatuses 200 are advantageously configured and positioned such that, other than in a region of the first and second torque tube beam segments 260, 265 of the torque tube beam 250 adjacent the in-line drive mechanism 150, the table axis of rotation R, is approximately vertically and horizontally aligned with, that is, would pass through or be acceptably close, for design purposes, to passing through a center of gravity or center of mass CM of the table 110. The center of mass CM of the table 110 is schematically depicted in the top plan view of FIG. 2.

Figure 4:
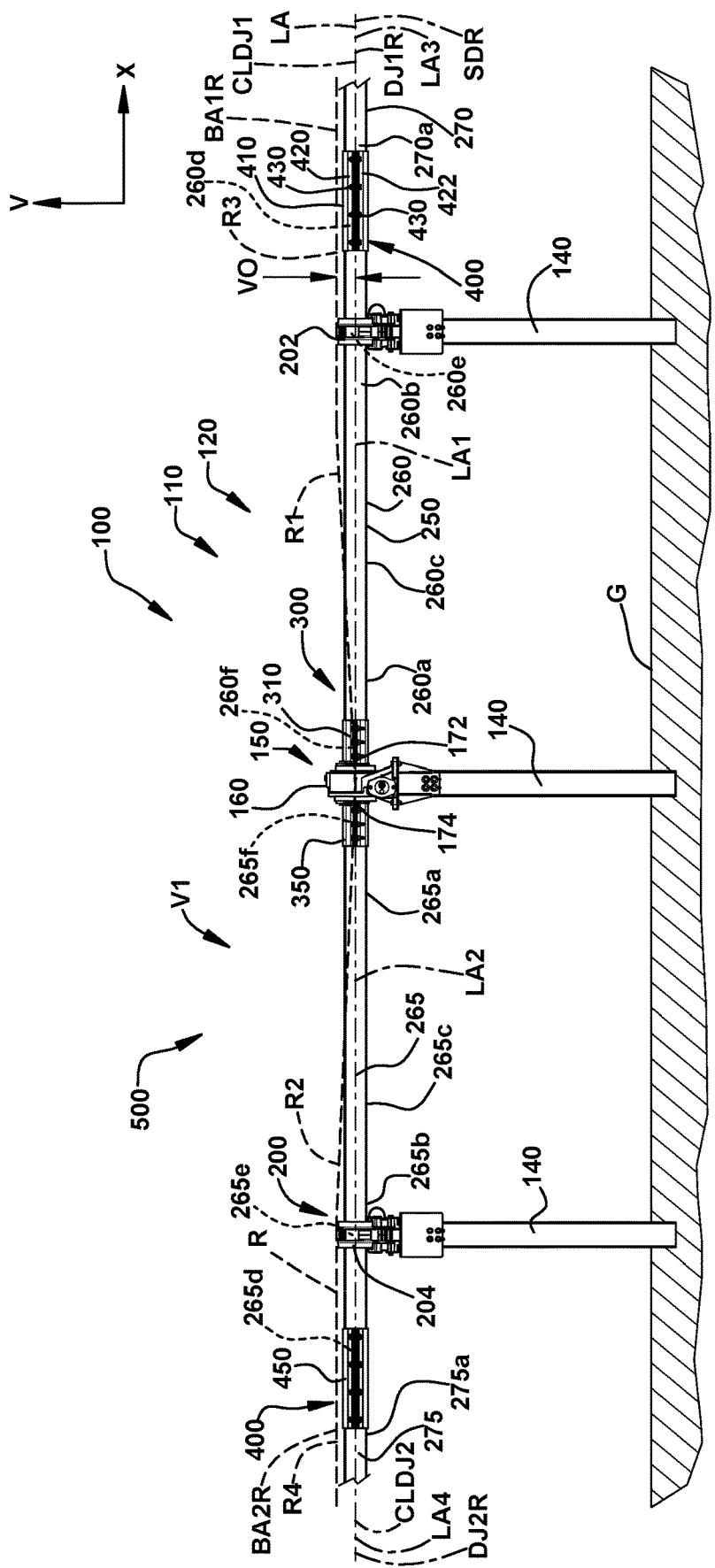
FIG. 4 is a schematic side elevation view of a portion of the solar tracker assembly of FIG. 1 illustrating a first exemplary concentric drive configuration of the present disclosure, the first exemplary concentric drive configuration including an in-line drive mechanism, a pair of concentric drive journals affixed to opposite sides of a rotatable drive of the in-line drive mechanism, and first and second torque tube beam segments supported at one end by the pair of concentric drive journals and supported at their respective opposite ends by a pair of bearing apparatuses, the first exemplary drive configuration being arranged such that the first and second torque tube beam segments are substantially horizontal and the axis of rotation of the table in the region of the first and second torque tube beams, when viewed in side elevation view, is a shallow, upright V configuration.
Figure 5:
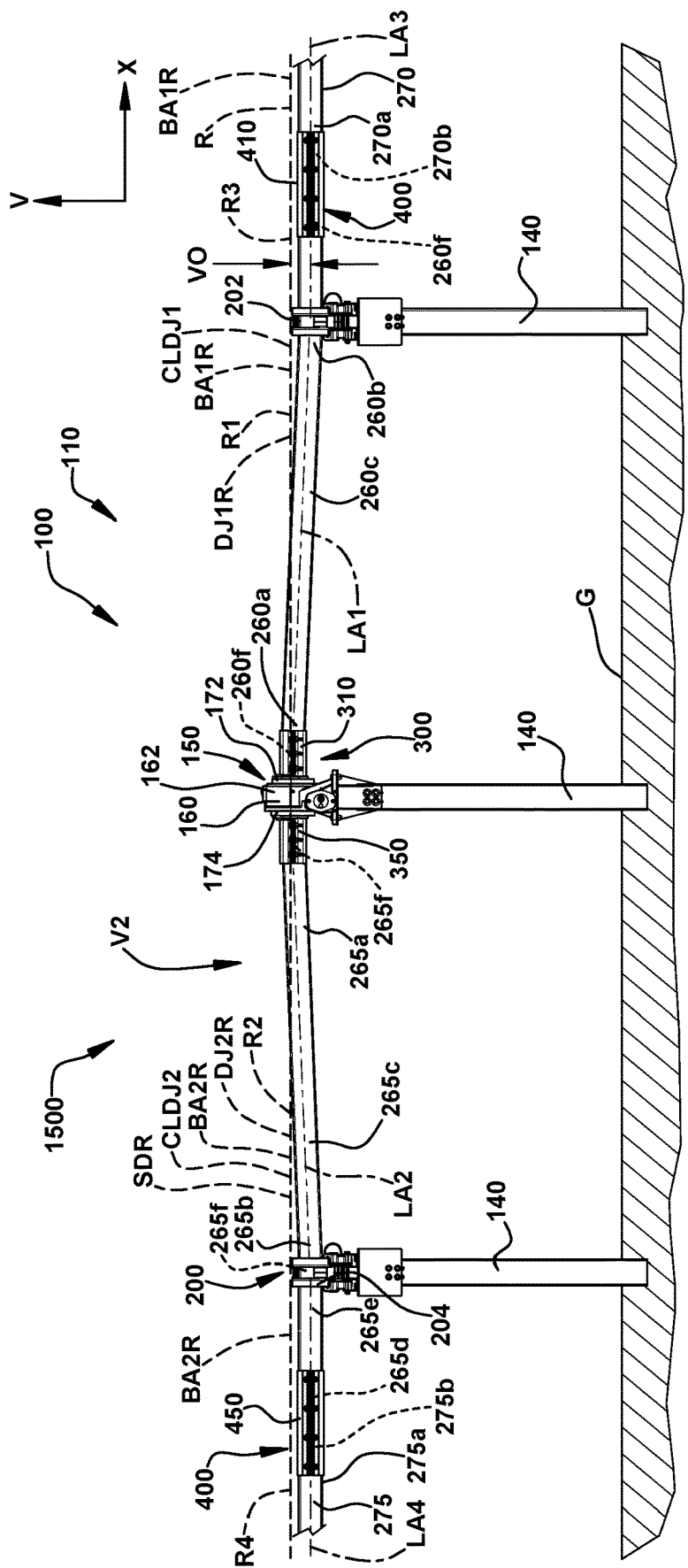
FIG. 5 is a schematic side elevation view of a portion of the solar tracker assembly of FIG. 1 illustrating a second exemplary concentric drive configuration of the present disclosure, the second exemplary concentric drive configuration including the in-line drive mechanism, the pair of concentric drive journals affixed to opposite sides of the rotatable drive of the in-line drive mechanism, and first and second torque tube beam segments supported at one end by the pair of concentric drive journals and supported at their respective opposite ends by the pair of bearing apparatuses, the second exemplary drive configuration being arranged such that the first and second torque tube beam segments, when viewed in side elevation view, have a shallow, inverted V configuration and the axis of rotation of the table in the region of the first and second torque tube beams is substantially horizontal.

Two exemplary embodiments of concentric drive configurations of the solar tracker assembly 100, namely, concentric drive configurations 500, 1500 are presented. The first concentric drive configuration 500 is schematically depicted in FIG. 4, while the second concentric drive configuration 1500 is depicted in FIG. 5. Both concentric drive configurations 500, 1500 include the in-line drive mechanism 150, a pair of concentric drive journals 300, including first and second drive journals 310, 350, which are advantageously concentric or aligned with an axis of rotation SDR of the drive mechanism 150. The concentric drive configurations 500, 1500 also include the first and second torque tube beam segments 260, 265 of the torque tube beam 250, which are respectively received by and affixed to the first and second drive journals 310, 350. That is, an axis of rotation DJ1R and a longitudinal center line CLDJ1 of the first drive journal 310 is substantially aligned with or coincident with the drive mechanism axis of rotation SDR and an axis of rotation DJ2R and a longitudinal center line CLDJ2 of the second drive journal 310 is substantially aligned with and coincident with the drive mechanism axis of rotation SDR. Both concentric drive configurations 500, 1500 also include two bearing apparatuses of the plurality of bearing apparatuses 200 which are closest to the in-line drive mechanism 152, namely, the first and second bearing apparatuses 202, 204.

As previously noted, it will be assumed that the table 110 is properly configured such that the table axis of rotation R, as viewed in top plan view (FIG. 2), is aligned with and passes through or approximately passes through, the center of mass CM of the table 110. The concentric drive configuration 500 of the present disclosure does not change a horizontal position of the table axis of rotation R. That is, as viewed in top plan view, the concentric drive configuration 500 does not shift the axis of rotation R away from passing through the center of mass CM of the table 110, as shown, for example, in the top plan view of FIG. 2, where the table axis of rotation R passes through or close to the center of mass CM of the table 110. Advantageously, the concentric drive configurations 500, 1500 of the present disclosure advantageously provide a reduction in the torque/power requirements of the drive mechanism 150 because of both: a) the concentric alignment of the drive mechanism axis of rotation SDR and the axes of rotation of the first and second drive journals DJ1R, DJ2R; and b) except for segments of the torque tube beam 250 adjacent the drive mechanism 150, the table axis of rotation R is approximately horizontally and vertically aligned with, that is, the table axis of rotation R passes through or is close to passing through the center of mass CM of the table 110. As used herein, the direction X is a horizontal direction parallel to the torque tube beam longitudinal axis LA, typically, in the north-south direction, the direction Y is a horizontal direction orthogonal to the torque tube beam longitudinal axis LA, typically in the east-west direction, and the direction V is a vertical direction orthogonal to X and Y directions. The vertical direction V includes the upward direction UP, away from the ground/substrate G, and the downward direction DW, toward the ground/substrate. For simplicity, it is assumed that the ground/substrate is horizontal (orthogonal to the vertical direction V) extending along and in the region of the torque tube beam 250.

Figure 3:
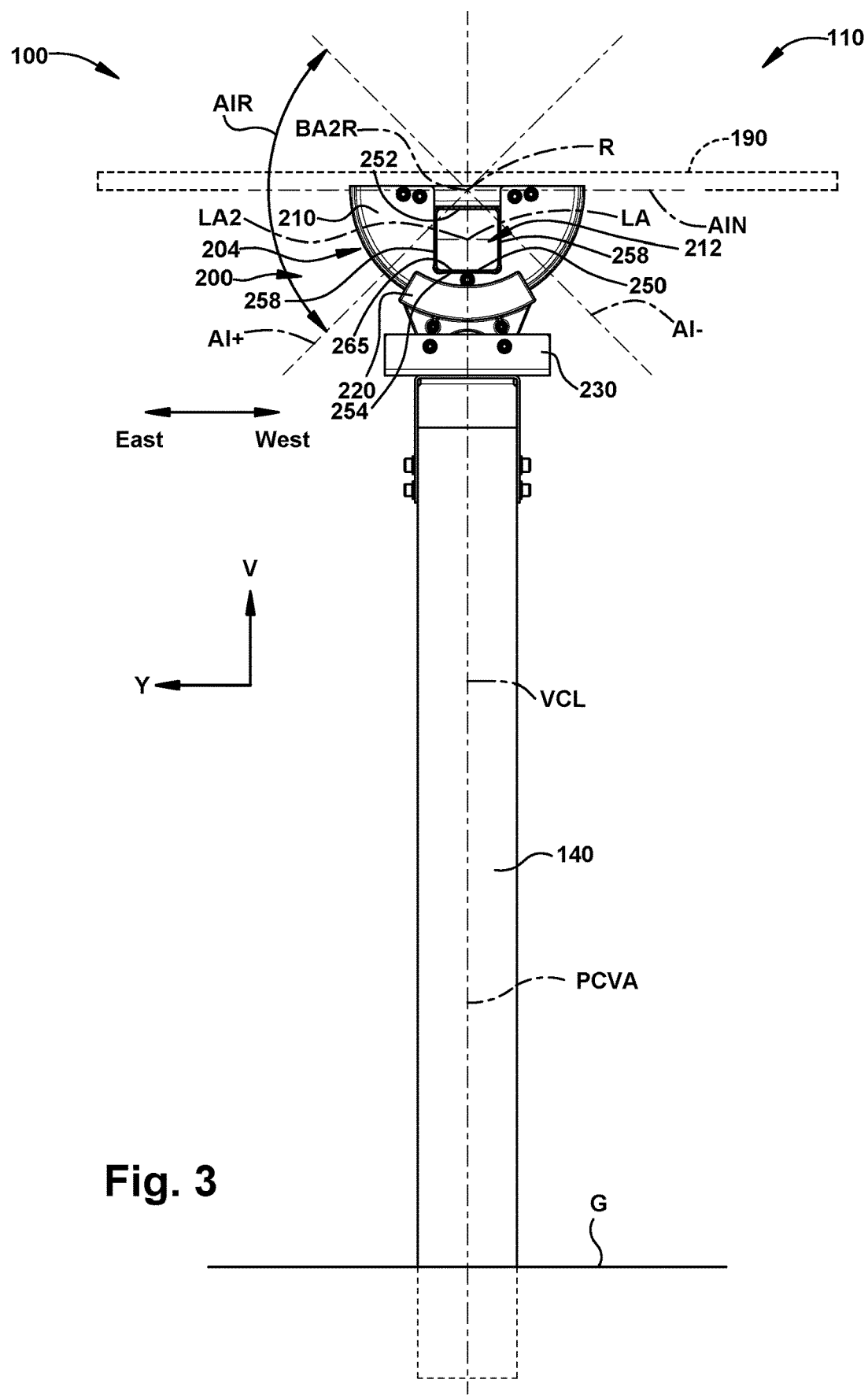
FIG. 3 is a schematic vertical section view of the solar tracker assembly of FIG. 1, as seen from a plane indicated by the line 3-3 in FIG. 2.

The solar tracker assembly 100 of the present disclosure includes the drive mechanism 150 which, operating under the control of a controller (not show), pivots or rotates the table 110, including the plurality of photovoltaic modules 190, about the axis of rotation R. The table 110 pivots through an angle of inclination AI such that the plurality of photovoltaic modules 190 follow a position of the sun as the sun moves from east to west. As best seen in FIG. 3, the table 110 rotates through a predetermined angular inclination range AIR between a maximum positive angle of inclination AI+ wherein the plurality of photovoltaic modules 190 are facing in an easterly direction to receive sunlight at sunrise and a negative angle of inclination wherein the plurality of photovoltaic modules 190 are facing in a westerly direction to receive sunlight at sunset. At a neutral angle of inclination AIN, the plurality of photovoltaic modules 190 are substantially horizontal, that is, with their upper light receiving surfaces facing directly upward, as would be the case at high noon where the sun is at its apex in the sky.

In one exemplary embodiment, the single axis solar tracker assembly 100 is a single row, horizontal, single axis solar tracker assembly and the drive mechanism 150 comprises a single slew drive or slew gear drive 160 which pivots the table 110 through the predetermined angle of inclination range AIR to track movement of the sun across the sky/horizon. However, one of skill in the art would appreciate that the concepts of the present disclosure are equally applicable to multiple row solar tracker systems, that is, multiple, spaced apart, parallel rows of solar tracking assemblies, as well as solar tracker systems where multiple slew drives are utilized within a single row to pivot the table 110. The table 110 includes all rotating or pivoting components of the solar tracker assembly 100 including: a) the plurality of photovoltaic modules 190, b) the frame 120 including the plurality of mounting brackets 130 which support the plurality of photovoltaic modules 190 and couple the plurality of photovoltaic modules 190 to the torque tube beam 250, c) the torque tube beam 250, extending generally in a north-south direction and extending horizontally, that is, parallel to the ground G, supports the frame 120 and, in turn, is driven through the angle of inclination range AIR by a rotating drive or rotatable drive member 170 of the drive mechanism 150; d) the rotatable bearing assemblies 210 of each of the plurality of bearing apparatuses 200 positioned at spaced apart intervals along the torque tube beam 250 which rotatably support the torque tube beam 120 (and thereby the frame 120 and plurality of photovoltaic modules 190) and define the axis of rotation R of the table 110; and e) the rotating drive 170 of the slew drive 160.

Each bearing apparatus, for example first and second bearing apparatuses 202, 204 of the plurality of bearing apparatuses 200 includes the rotatable or rotating bearing assembly 210, the stationary saddle assembly 220 and a connecting assembly 230. The torque tube beam 250 extends through and is supported by the rotatable bearing assembly 210 which rotates the torque tube beam 250 about the table axis of rotation R. The rotatable bearing assembly 210 of the bearing apparatus 200, in turn, is supported by the stationary saddle assembly 220. The stationary saddle assembly 220 constrains the pivoting or rotation of the rotatable bearing assembly 210 such that the bearing assembly and the torque tube section extending through and supported by the rotatable bearing assembly 210 rotate about a bearing axis of rotation. The table axis of rotation R (except in the region of the slew drive 160) is collectively defined by axes of rotation of the plurality of bearing apparatuses 200 positioned at spaced apart internals along the extent of the torque tube beam 250. Stated another way, each bearing axis of rotation of each bearing apparatus defines a portion of the overall table axis of rotation R. The individual axis of rotation of each of the plurality of solar tracker bearing apparatuses 200 are substantially aligned to or coincident to form a single or combined table axis of rotation R. The exception to this is the region or segments of the torque tube beam 250 adjacent the slew drive 160 and the first and second concentric drive journals 310, 350. In this region, the axis of rotation R of the table 110 is defined by the drive mechanism axis of rotation SDR, that is, the axis of rotation of the rotating drive or rotating drive member 170 of the slew drive 160.

Figure 2:
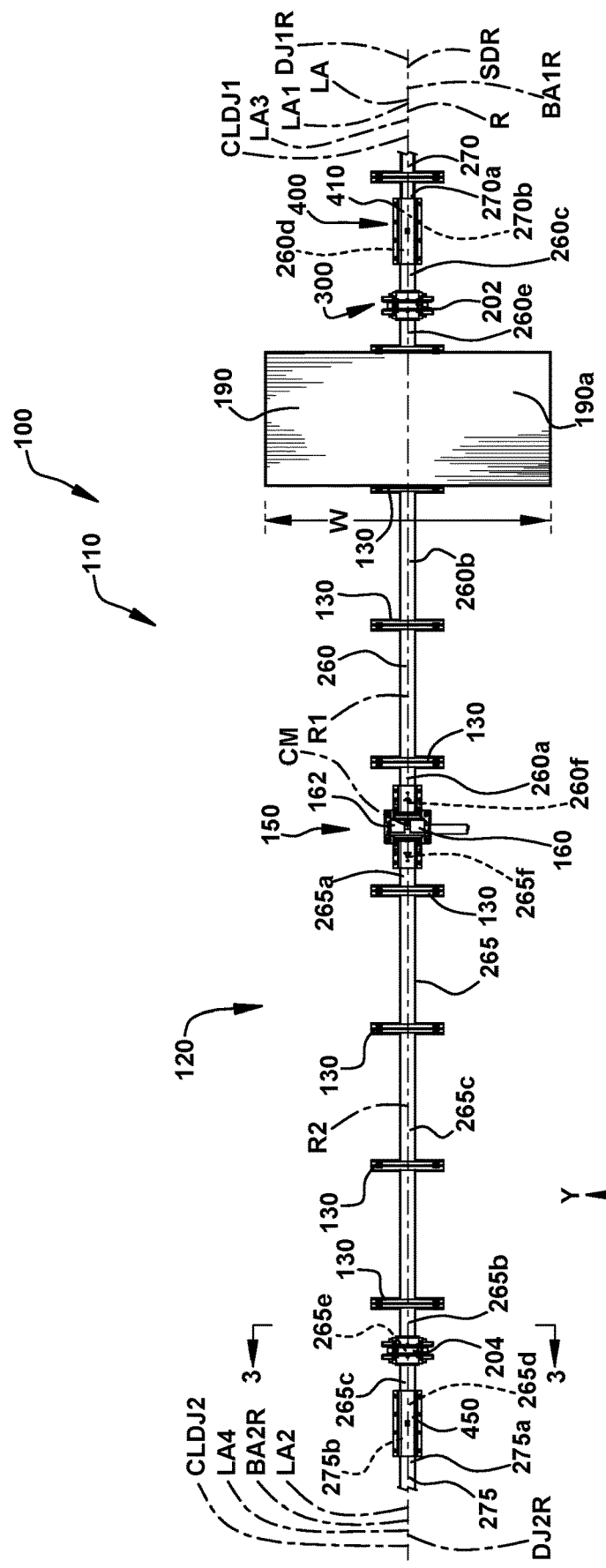
FIG. 2 is a schematic top plan view of the solar tracker assembly of FIG. 1.

The stationary saddle assembly 220 is mounted by the connecting assembly 230 to a support post 140, which is driven into the ground/substrate G or otherwise secured in the ground/substrate G by, for example, concrete. Thus, the support post 140 and connecting assembly 230 determine the position and the vertical height of the rotatable bearing assembly 200. Each of the support posts 140 extend in the vertical direction V along a vertical center line or central vertical axis PCVA (FIG. 3) of the support post 140. For each of the support posts 140, a vertical center line VCL of the bearing assembly 200 is aligned with the center line of the support post 140. The slew drive 160 is similar affixed to a support post 140, which determines the position and vertical height of the rotating drive 170 of the slew drive 160 for purposes of the concentric drive configuration 500. The frame 120, in one exemplary embodiment, includes a plurality of mounting brackets 130 which are spaced along the longitudinal extent of the torque tube beam 250 and each of which is affixed to the torque tube beam 250. Each of the plurality of mounting brackets 130 function to individually secure each photovoltaic module, such as the representative photovoltaic module 190a, of the plurality of photovoltaic modules 190 to the torque tube beam 250. For simplicity, only the single representative photovoltaic module 190a is schematically depicted in FIGS. 1 and 2 and is shown in dashed line in FIG. 3. Also not shown in the drawings are a number of clamps and fasteners, which are part of the frame 120 and facilitate securing the plurality of photovoltaic modules 190 to the plurality of mounting brackets 130 and securing the plurality of mounting brackets 130 to the torque tube beam 250. Additional details concerning the configuration of the bearing apparatuses and the frame/mounting brackets may be found in the aforesaid U.S. Pat. No. 10,944,354 to Ballentine et al. and U.S. Pat. No. 11,271,518 to Ballentine et al., both of which are incorporated herein by reference in their respective entireties.

In one exemplary embodiment, the torque tube beam 250 comprises a hollow metal tube that is substantially square in cross section, having an open interior that is centered about a central longitudinal axis LA. In one exemplary embodiment, the torque tube beam 250 is approximately 100 mm. by 100 mm. (approximately 4 in. by 4 in.) and includes an upper wall 252 and a lower wall 254 spaced apart by parallel side walls 258. The torque tube beam 250 extends along the longitudinal axis LA of the torque tube beam 250 and, as noted above, extends generally parallel to the ground G. Hence, as the ground is generally horizontal, the solar tracker assembly is referred to as a horizontal, single axis solar tracker assembly 100. The torque tube beam 250 is comprised of a number of connected torque tube beam segments, each of which is approximately 40 feet in length. In the schematic depiction of FIGS. 1, 2, 4 and 5, only a portion of the solar tracker assembly 100 and, thus, only a portion of the extent of the torque tube beam 250 and the frame 120 and a portion of the total number of bearing apparatuses of the plurality of bearing apparatuses 200 are shown. For example, in FIGS. 1, 2, 4 and 5, the first and second torque tube beam segments 260, 265 and portions of the third and fourth torque tube beam segments 270, 275 are schematically depicted. Of course, it should be appreciated that given that a torque tube beam segment is typically 40 feet in length and a typical photovoltaic module, such as the representative photovoltaic module 190a is approximately 1 meter by 2 meters and is mounted to the torque tube beam 250 in portrait orientation, many more photovoltaic modules would be present on any given torque tube beam segment than is schematically depicted in the FIGS. 1 and 2. Given that the plurality of photovoltaic modules 190 are supported in portrait orientation by the plurality of mounting brackets 130, a width W of the table 110 is typically 2 meters.

The solar tracker assembly 100, in one exemplary embodiment may include five, 40-foot torque tube beam segments on one side of the drive mechanism 150 and another five, 40-foot torque tube beam segments on an opposite side of the drive mechanism 150 providing a total north-south extent or length of the torque tube beam 250 of approximately 400 feet. End portions of adjacent torque tube beam segments, such as, for example, first and third torque tube beam segments 260, 270, are affixed together by a first coupler 410 of a plurality of couplers or splicing members 400 and the second and fourth torque tube beam segments 265, 275 are affixed together by a second coupler 450 of the plurality of couplers 400. Each coupler of the plurality of couplers 400, for example the first coupler 410 including mating first and second members 420, 422 (FIG. 4) defining a clamshell configuration having a longitudinally extending through bore 412. The first and second members 420, 422 are affixed by a plurality of fasteners 430 extending between facing edge portions of the first and second members 420, 422. Respective distal end sections of end portions of adjacent torque tube beam segments are received within the through bore 412 and, when the plurality of fasteners 430 are secured, the adjacent end sections of the end portions of the adjacent torque tube beam segments are rigidly secured such the coupled torque tube beam segments rotate in unison. For example, respective adjacent end portions 260b, 270a of the first and third torque tube beam segments 260, 270 are secured together by the first coupler 410 rotate in unison through the angle of inclination range AIR, as driven by the drive mechanism 150. Similarly, respective adjacent end portion 265b, 275a of the second and fourth torque tube beam segments 265, 275 are secured together by the second coupler 450 rotate in unison through the angle of inclination range AIR, as driven by the drive mechanism 150.

As noted above, in the schematic depictions of FIGS. 4 and 5, only a portion of the solar tracker assembly 100 is shown to illustrate first and second embodiments of the concentric drive configurations 500, 1500 of the present disclosure. Specifically, FIGS. 4 and 5 depict regions of the solar tracker assembly 100 in proximity to the drive mechanism 150 to schematically illustrate the first and second concentric drive configurations 500, 1500, respectively. The first torque tube beam segment 260 extends along a central longitudinal axis LA1, which comprises part of the central longitudinal axis LA of the torque tube beam 250 and includes a first end portion 260a and the second end portion 260b, spaced apart by a longitudinally extending middle portion 260c. The second torque tube beam segment 265 extends along a central longitudinal axis LA2, which comprises part of the central longitudinal axis LA of the torque tube beam 250 and includes a first end portion 265a and the second end portion 265b, spaced apart by a middle portion 265c. Only portions of the third and fourth torque tube beam segments 270, 275 are shown in FIGS. 4 and 5. The third torque tube beam segment 270 extends along a central longitudinal axis LA3, which comprises part of the central longitudinal axis LA of the torque tube beam 250 and includes a first end portion 270a and a second end portion (not shown), spaced apart by a middle portion. Similarly, the fourth torque tube beam segment 275 extends along a central longitudinal axis LA4, which comprises part of the central longitudinal axis LA of the torque tube beam 250 and includes a first end portion 275a and a second end portion (not shown), spaced apart by a middle portion.

The first end portion 260a of the first torque tube beam segment 260, is received by and affixed to the first drive journal 310. Specifically, a proximal end section 260f of the first end portion 260a of the first torque tube beam segment 260 is received in a longitudinally extending receiver or opening 312 of the first drive journal 310. An intermediate section 260e of the second end portion 260b of the first torque tube beam segment 260, which is spaced from a distal end section 260d of the second end portion 260b of the first torque tube beam segment 260, is received in a torque tube beam slot 212 of the rotating bearing assembly 210 of the first bearing apparatus 202. The distal end section 260d of the second end portion 260b of the first torque tube beam segment 260 and a proximal end section 270b of the first end portion 270a of the third torque tube beam segment 270 are secured together by the first coupler 410 of the plurality of couplers 400 such that the first and third torque tube beam segments 260, 270 rotate in unison through the angle of inclination range AIR, as driven by the drive mechanism 150.

Similarly, the first end portion 265a of the second torque tube beam segment 265 is received by and affixed to the first drive journal 310. Specifically, a proximal end section 265f of the first end portion 265a of the second torque tube beam segment 265 is received in a longitudinally extending opening or receiver 352 of the second drive journal 350. As best seen in FIG. 3, an intermediate section 265e of the second end portion 265b of the second torque tube beam segment 265, which is spaced from a distal end section 265d of the second end portion 265b of the second torque tube beam segment 265, is received in a torque tube beam slot 212 of the rotating bearing assembly 210 of the second bearing apparatus 204. The distal end section 265d of the second end portion 265b of the second torque tube beam segment 265 and a proximal end section 275b of the first end portion 275a of the fourth torque tube beam segment 275 are secured together by the second coupler 450 of the plurality of couplers 400 such that the second and fourth torque tube beam segments 260, 270 rotate in unison through the angle of inclination range AIR, as driven by the drive mechanism 150.

In one exemplary embodiment, the in-line drive mechanism 150 comprises the slew drive 160. By in-line, it is meant that the axis of rotation SDR of the rotating or rotatable or rotational member 170 of the slew drive 160 is substantially aligned with or coincident with: a) the longitudinal center lines CLDJ1, CLDJ2 of first and second drive journals 310, 350; b) a portion of a longitudinal axis LA1 of the first torque tube beam segment 260 in a region of the proximal end section 260f of the first end portion 260a of the first torque tube beam segment 260, which is received in the longitudinally extending receiver or opening 312 of the first drive journal 310; and c) a portion of a longitudinal axis LA2 of the second torque tube beam segment 265 in a region of the proximal end section 265f of the first end portion 265a of the second torque tube beam segment 265, which is received in the longitudinally extending receiver or opening 352 of the second drive journal 350. The slew drive 160 includes the rotating or rotatable member 170 supported for rotation about the drive mechanism axis of rotation SDR by a stationary housing 162. A gear drive arrangement (not shown) of the slew drive 160 rotates the rotating member 170 about the drive mechanism axis of rotation SDR under the control of a controller. The rotating member 170 includes generally planar, oppositely facing first and second sides 172, 174. Each of the first and second sides 172, 174 includes an array of threaded openings which receive threaded fasteners used to secure the first and second drive journals 310, 350 to the respective first and second sides 172, 174. The rotating member 170 of the slew drive 160 pivots or rotates the first and second drive journals 310, 350 affixed to opposite sides 172, 174 of the rotational drive 170 about the drive mechanism axis of rotation SDR, that is, the axis of rotation of the rotating member 170 of the slew drive 160. This, in turn, causes the table 110 to rotate about the table axis of rotation R.

Figure 6:
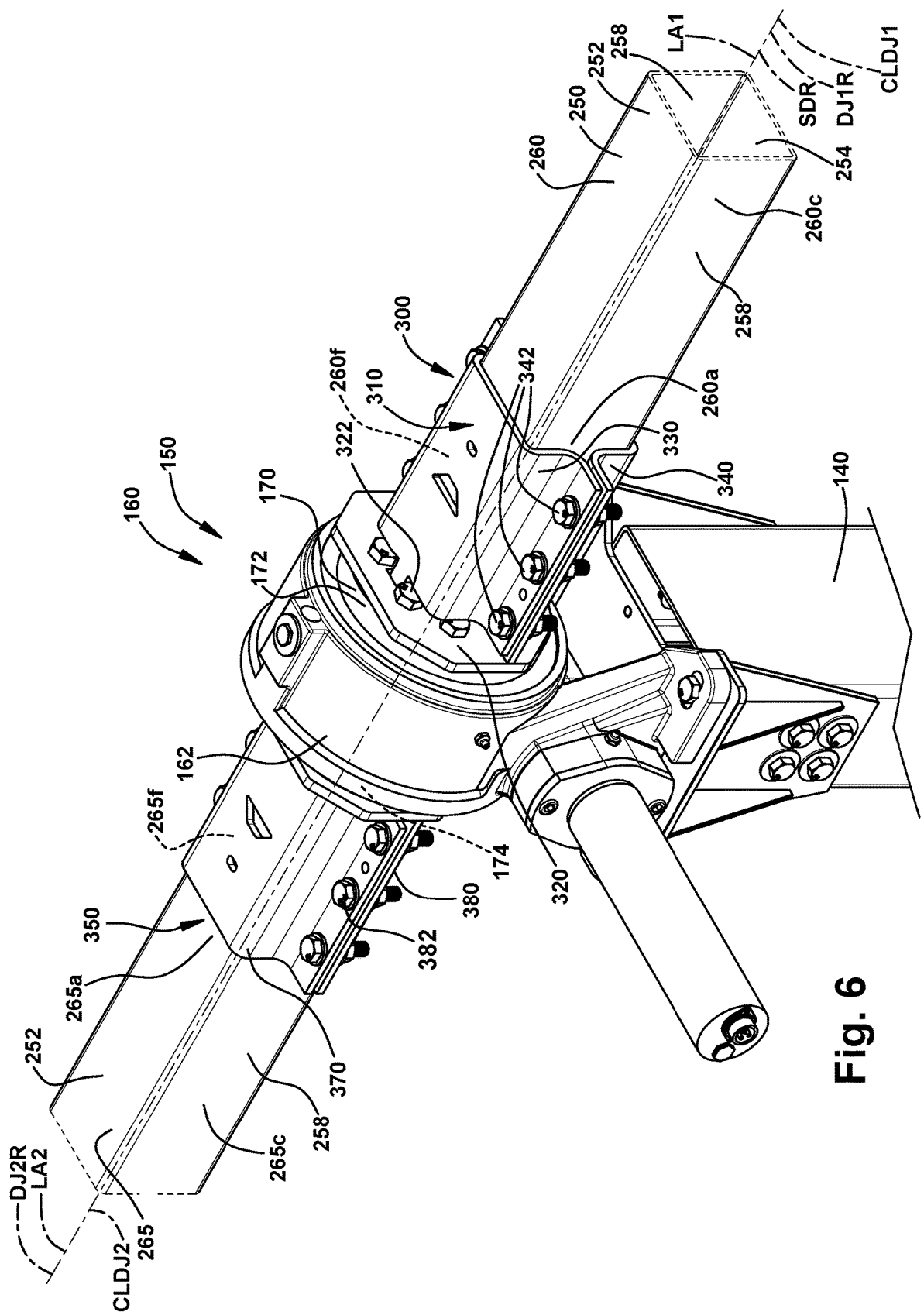
FIG. 6 is a schematic top perspective view of a portion of the solar tracker assembly of FIG. 1 depicting the in-line drive mechanism and the pair of concentric drive journals affixed to opposite sides of the rotatable drive of the in-line drive mechanism.

The first and second drive journals 310, 350 are mirror images. As best seen in FIG. 6, the first drive journal 310 includes a substantially planar mounting flange 320 and first, upper and second, lower members 330, 340 extending orthogonally from the mounting flange 320. In one exemplary embodiment, the upper and lower members 330, 340 have a mating clamshell configuration with edge portions having aligned opening for securing the upper and lower members 330, 340 together. In one exemplary embodiment, the second, lower member 340 is integral with an outwardly facing surface 324 of the mounting flange 320, that is, the surface of the mounting flange 320 that faces away from the first side 172 of the rotating member 170 of the slew drive 160. Thus, the lower member 340 is permanently affixed to the mounting flange 320. A plurality of fasteners 342 pass through the aligned openings of the edge portions of the upper and lower members 330, 340 to secure the upper and lower members 330, 340 together and to additionally secure the proximal end section 260f of first end portion 260a of the first torque tube beam segment 260 between the upper and lower members 330, 340. The clamshell configuration of the upper and lower members 330, 340 define the longitudinally extending opening or receiver 312 of the first drive journal 310 which receives the proximal end section 260f of first end portion 260a of the first torque tube beam segment 260. The longitudinally extending receiver 312 of the first drive journal 310 is centered about the longitudinal center line CLDJ1 of the first drive journal 310. The mounting flange 320 of the first drive journal 310 includes a plurality of openings for receiving a plurality of fasteners 322 which extend through the flange 320 and into aligned threaded openings of the first side 172 of the rotating member 170 of the slew drive 160 to affix the first drive journal 310 (and the first torque tube beam segment 260) to the rotating member 170 of the slew drive 160. The configuration and orientation of the first drive journal 310 is such that the longitudinal center line CLDJ1 of the longitudinally extending receiver 312 of the first drive journal 310 is aligned with or coincident with the drive mechanism axis of rotation SDR.

Similarly, the second drive journal 350 includes a substantially planar mounting flange 360 and first, upper and second, lower members 370, 380 extending orthogonally from the mounting flange 360. In one exemplary embodiment, the upper and lower members 370, 380 have a mating clamshell configuration with edge portions having aligned opening for securing the upper and lower members 370, 380 together. In one exemplary embodiment, the second, lower member 380 is integral with an outwardly facing surface of the mounting flange 360, that is, the surface of the mounting flange 360 that faces away from the second side 174 of the rotating member 170 of the slew drive 160. Thus, the lower member 380 is permanently affixed to the mounting flange 360. A plurality of fasteners 382 pass through the aligned openings of the edge portions of the upper and lower members 370, 380 to secure the upper and lower members 370, 380 together and to additionally secure the proximal end section 265f of first end portion 265a of the second torque tube beam segment 265 between the upper and lower members 370, 380. The clamshell configuration of the upper and lower members 370, 380 define the longitudinally extending opening or receiver 352 of the second drive journal 350 which receives the proximal end section 265f of first end portion 265a of the second torque tube beam segment 265. The longitudinally extending receiver 352 of the second drive journal 350 is centered about the longitudinal center line CLDJ2 of the second drive journal 350. The mounting flange 360 of the second drive journal 350 includes a plurality of openings for receiving a plurality of fasteners which extend through the flange 360 and into aligned threaded openings of the second side 174 of the rotating member 170 of the slew drive 160 to affix the second drive journal 350 (and the second torque tube beam segment 265) to the rotating member 170 of the slew drive 160. The configuration and orientation of the second drive journal 350 is such that the longitudinal center line CLDJ1 of the longitudinally extending receiver 352 of the second drive journal 350 is aligned with or coincident with the drive mechanism axis of rotation SDR, that is, the axis of rotation of the rotating member 170 of the slew drive 160.

First Exemplary Embodiment—Concentric Drive Configuration 500

As schematically depicted in FIG. 4, the first exemplary embodiment of the concentric drive configuration of the solar tracker assembly 100 of the present disclosure is shown generally at 500. The first concentric drive configuration 500 advantageously provides for a concentric drive of the first end portions 260a, 260b of the first and second torque tube beam segments 260, 265 respectively coupled to the first and second drive journals 310, 350. As noted above, the first torque tube beam segment 260 extends along the longitudinal axis LA1 and the second torque tube beam segment 265 extends along the longitudinal axis LA2. The proximal end section 260f of the first end portion 260a of the first torque tube beam segment 260 is secured within the longitudinally extending receiver 312 of the first drive journal 310. The proximal end section 265f of the first end portion 265a of the second torque tube beam segment is secured within the longitudinally extending receiver 352 of the second drive journal 310. The intermediate section 260e of the second end portion 260b of the first torque tube beam segment 260, which is spaced from the distal end section 260d of the second end portion 260b of the first torque tube beam segment 260, is received in the torque tube beam slot 212 of the rotating bearing assembly 210 of the first bearing apparatus 202, while the distal end section 260d of the second end portion 260b of the first torque tube beam segment 260 and the proximal end section 270b of the first end portion 270a of the third torque tube beam segment 270 are secured together by the first coupler 410. Similarly, the intermediate section 265e of the second end portion 265b of the second torque tube beam segment 265, which is spaced from a distal end section 265d of the second end portion 265b of the second torque tube beam segment 265, is received in the torque tube beam slot 212 of the rotating bearing assembly 210 of the second bearing apparatus 204. The distal end section 265d of the second end portion 265b of the second torque tube beam segment 265 and the proximal end section 275b of the first end portion 275a of the fourth torque tube beam segment 275 are secured together by the second coupler 450.

In the concentric drive configuration 500, as best seen in FIG. 4, the first and second torque tube beam segments 260, 265 are: a) substantially horizontal (parallel to the ground G); and b) the axis of rotation R of the table 110 in the region of the first and second torque tube beam segments 260, 265 (schematically depicted in FIG. 4 as R1-axis of rotation of the table 110 in the region of the first torque tube beam segment 260 and R2-axis of rotation of the table 110 in the region of the second torque tube beam segment 265), when viewed in side elevation view, is a shallow, upright-V shape or configuration V1. The height of the individual support posts 140 for the slew drive 160 and the first and second bearing apparatuses 202, 204 are properly set with respect to the ground/substrate G such that the central longitudinal axes LA1, LA2, LA3, LA4 of the first, second, third and fourth torque tube beam segments are substantially vertically aligned and are horizontal (that is, parallel to the X axis and the ground/substrate G, which is presumed to be horizontal). The reason for the shallow, upright V-shape or configuration V1 of the axes of rotation R1, R2, which are part of the axis of rotation R of the table 110, in the region of the first and second torque tube beam segments 260, 265 and as viewed in side elevation (as shown in FIG. 4) can be explained as follows.

The axis of rotation R1 of the first torque tube beam segment 260 in a region of the second end portion 260b is defined by the first bearing apparatus 202. Specifically, the intermediate section 260e of the second end portion 260b of the first torque tube beam segment 260 passes through the torque tube beam slot 212 of the first bearing apparatus 202. An axis of rotation BA1R defined by the first bearing apparatus 202 is vertically slightly above the upper wall 252 of the first torque tube beam segment 260 in the region where the intermediate section 260e of the second end portion 260b of the first torque tube beam 260 passes through the torque tube beam slot 212. By contrast, at the opposite end of the first torque tube beam segment 260, the proximal end section 260*f* of the first end portion 260*a* is constrained by the first drive journal 310 to rotate about the longitudinal center line CLDJ1 of the first drive journal 310, which is aligned with or coincident with the axis of rotation DJ1R of the first drive journal 310 and is aligned with or coincident with the drive mechanism axis of rotation SDR, that is, the axis of rotation of the rotating drive 170 or, stated another way, the rotating drive axis of rotation SDR. Accordingly, the first end portion 260*a* of the first torque tube beam segment 260 is constrained by the first drive journal 310 to rotate about the longitudinal axis LA1 of the first torque tube beam segment 260, which is aligned with the drive mechanism axis of rotation SDR, while the second end portion 260*b* of the first torque tube beam segment 260 is constrained by the first bearing apparatus 202 to rotate about the first bearing axis of rotation BA1R (which defines part of the table axis of rotation R).

Thus, even though the first torque tube beam segment 260 is horizontal or parallel with the ground G, as seen in FIG. 3, the axis of rotation BA1R defined by the first bearing apparatus 202 is vertically slightly above the upper wall 252 of the first torque tube beam segment 260 in the region where the intermediate section 260*e* of the second end portion 260*b* of the first torque tube beam 260 passes through the torque tube beam slot 212. Thus, the first bearing axis of rotation BA1R is vertically higher or above the axis of rotation DJ1R of the first drive journal 310. Accordingly, the first bearing axis of rotation BA1R is vertically offset from the longitudinal center line CLDJ1 of the first drive journal 310 and is vertically offset from the drive mechanism axis of rotation SDR. Further, when viewed in side elevation view, while the longitudinal axis LA1 of the first torque tube beam segment 260 is horizontal, the axis of rotation R of the table 110, in the region of the first torque tube beam segment 260, the first torque tube beam segment axis of rotation R1 (which is part of the table axis of rotation R) angles upwardly from the first end portion 260*a* to the second end portion 260*b* of the first torque tube beam segment 260 (forming one half of the shallow, upright V configuration referred to above. That is, the first torque tube beam segment axis of rotation R1 angles upwardly from a lower position of the axis of rotation R1 defined by the axis of rotation DJ1R of the first drive journal 310 (and the coincident drive mechanism axis of rotation SDR), corresponding to the first end portion 260*a* of the first torque tube beam segment 260, to a higher position of the axis of rotation R1 defined by the first bearing axis of rotation BA1R, corresponding to the second end position 260*b* of the first torque tube beam segment 260. The table axis of rotation R in the region of the third torque tube beam segment 270, schematically shown as R3 in FIG. 4, as well as those torque tube beam segments (not shown) beyond the third torque tube beam segment 270, is horizontal. In one exemplary embodiment, a vertical drop or vertical offset VO (FIG. 4) of the table axis of rotation R over the approximate 40-foot length of the first torque tube beam segment 260 is approximately 3 inches between the first bearing axis of rotation BA1R and the axis of rotation DJ1R of the first drive journal 310. Stated another way, the drive mechanism axis of rotation SDR is approximately three inches lower than the table axis of rotation R at the first bearing apparatus 202 (as defined by the first bearing axis of rotation BA1R).

The flexibility of the first torque tube beam segment 260 over its 40-foot length combined with the modest size of the vertical offset of the axis of rotation R1 permits implementation of the concentric drive configuration 500 with minimal operating issues, while obtaining the benefits and advantages of concentric drive of the solar tracker assembly 100, as noted above, including the ability to utilize a smaller capacity slew drive to rotate the table 110 through the predetermined angle of inclination range AIR.

Similarly, axis of rotation R2 of the second torque tube beam segment 265 in a region of the second end portion 265*b* is defined by the second bearing apparatus 204. Specifically, the intermediate section 265*e* of the second end portion 265*b* of the second torque tube beam segment 265 passes through the torque tube beam slot 212 of the second bearing apparatus 204. An axis of rotation BA2R defined by the second bearing apparatus 204 is vertically slightly above the upper wall 252 of the second torque tube beam segment 265 in the region where the intermediate section 265*e* of the second end portion 265*b* of the second torque tube beam 265 passes through the torque tube beam slot 212. By contrast, at the opposite end of the second torque tube beam segment 265, the proximal end section 265*f* of the first end portion 265*a* is constrained by the second drive journal 350 to rotate about the longitudinal center line CLDJ2 of the second drive journal 350, which is aligned with or coincident with the axis of rotation DJ2R of the second drive journal 350 and is aligned with or coincident with the drive mechanism axis of rotation SDR, that is, the axis of rotation of the rotating drive 170 of the slew drive 160 or, stated another way, the rotating drive axis of rotation SDR. Accordingly, the first end portion 265*a* of the second torque tube beam segment 265 is constrained by the second drive journal 350 to rotate about the longitudinal axis LA2 of the second torque tube beam segment 265, which is aligned with the drive mechanism axis of rotation SDR, while the second end portion 265*b* of the second torque tube beam segment 265 is constrained by the second bearing apparatus 204 to rotate about the second bearing axis of rotation BA2R (which defines part of the table axis of rotation R).

Thus, even though the second torque tube beam segment 265 is horizontal or parallel with the ground G, the axis of rotation BA2R defined by the second bearing apparatus 204 is vertically slightly above the upper wall 252 of the second torque tube beam segment 265 in the region where the intermediate section 265*e* of the second end portion 265*b* of the second torque tube beam 265 passes through the torque tube beam slot 212. Thus, the second bearing axis of rotation BA2R is vertically higher or above the axis of rotation DJ2R of the second drive journal 310. Accordingly, the second bearing axis of rotation BA2R is vertically offset from the longitudinal center line CLDJ2 of the second drive journal 310 and is vertically offset from the drive mechanism axis of rotation SDR. Further, when viewed in side elevation view, while the longitudinal axis LA2 of the second torque tube beam segment 265 is horizontal, the axis of rotation R of the table 110, in the region of the second torque tube beam segment 260, that is, the second torque tube beam segment axis of rotation R2 (which is part of the table axis of rotation R) angles upwardly from the first end portion 265*a* to the second end portion 265*b* of the second torque tube beam segment 265, forming one half of the shallow, upright V configuration referred to above. That is, the second torque tube beam segment axis of rotation R2 angles upwardly from a lower position of the axis of rotation R2 defined by the axis of rotation DJ2R of the second drive journal 350 (and the coincident drive mechanism axis of rotation SDR), corresponding to the first end portion 265*a* of the second torque tube beam segment 265, to a higher position of the axis of rotation R2 defined by the second bearing axis of rotation BA2R, corresponding to the second end position 265*b* of the second torque tube beam segment 265. Stated another way, the drive mechanism axis of rotation SDR is approximately three inches lower than the table axis of rotation R at the second bearing apparatus 202 (as defined by the second bearing axis of rotation BA2R). The table axis of rotation R in the region of the fourth torque tube beam segment 270, schematically shown as R4 in FIG. 4, as well as those torque tube beam segments (not shown) beyond the fourth torque tube beam segment 275 is horizontal. In one exemplary embodiment, the vertical drop or offset VO of the table axis of rotation R over the approximate 40-foot length of the second torque tube beam segment 265 is approximately 3 inches between the second bearing axis of rotation BA2R and the axis of rotation DJ2R of the second drive journal 310. The flexibility of the second torque tube beam segment 265 over its 40-foot length combined with the modest size of the vertical offset of the axis of rotation R2 permits implementation of the concentric drive configuration 500 with minimal operating issues, while obtaining the benefits and advantages of a concentric drive of the table 110 of the solar tracker assembly 100, as noted above.

Moreover, the second end portions 260b, 265a for the first and second torque tube beam segments 260, 1265 are respectively constrained by the first and second bearing apparatuses 202, 204 to rotate about the respective bearing axes of rotation BA1R, BA2R as the table 110 of the solar tracker assembly 100 is pivoted by the rotating drive 170 through the predetermined inclination angle range AIR of the table 110, while the first end portions 260a, 265a are constrained by the first and second drive journals 310, 350 to rotate about the drive mechanism axis of rotation SDR. Thus, the second end portions 260b, 265a for the first and second torque tube beam segments 260, 1265 swing or pivot through an arcuate path about the respective bearing axes of rotation BA1R, BA2R as the table 110 of the solar tracker assembly 100 is pivoted by the rotating drive 170 through the predetermined inclination angle range AIR of the table 110. Therefore, the longitudinal axis LA1 of the first torque tube beam segment 260 in a region of the second end portion 260b moves through an arcuate path that includes both horizontal and vertical movement, that is, movement in the Y (horizontal) and V (vertical) directions about the first bearing axis of rotation BA1R. Similarly, the longitudinal axis LA2 of the second torque tube beam segment 265 in a region of the second end portion 265b moves through an arcuate path that includes both horizontal and vertical movement, that is, movement in the Y (horizontal) and V (vertical) directions about the second bearing axis of rotation BA2R.

As can be seen in FIG. 3, at the neutral angle of inclination AIN of the table 110, the bearing axis of rotation BA2R of the second bearing 204 is offset from, that is, is vertically above the longitudinal axis LA2 of the second torque tube beam segment 265, accordingly, as the second end portion 265b of the second torque tube beam segment 265 is rotated about the bearing axis of rotation BA2R of the second bearing 204, the longitudinal axis LA2 of the second torque tube beam segment 265 in the region of the second end portion 265b is offset both vertically and horizontally from the longitudinal axis LA2 of the second torque tube beam 265 in the region of the first end portion 265a of the second torque tube beam segment 265. The same is true for the first torque tube beam segment 260, that is, as the second end portion 260b of the first torque tube beam segment 260 is rotated about the bearing axis of rotation BA1R of the first bearing 202, the longitudinal axis LA1 of the first torque tube beam segment 260 in the region of the second end portion 260b is offset both vertically and horizontally from the longitudinal axis LA1 of the first torque tube beam 260 in the region of the first end portion 260a of the first torque tube beam segment 260. Accordingly, a portion of the first central longitudinal axis LA1 of the first torque tube beam segment 260 in a region of the second end portion 260b of the first torque tube beam segment 260 is offset vertically and horizontally from a portion of the first central longitudinal axis LA1 of the first torque tube beam segment 260 in a region of the first end portion 260a of the first torque tube beam 260. In the same way, as the table 110 of the solar tracker assembly 100 is pivoted by the rotating drive 170 through the predetermined inclination angle range AIR of the table 110, a portion of the second central longitudinal axis LA2 of the second torque tube beam segment 265 in a region of the second end portion 265b of the second torque tube beam segment 265 is offset vertically and horizontally from a portion of the second central longitudinal axis LA2 of the second torque tube beam segment 265 in a region of the first end portion 265a of the second torque tube beam 265.

Second Exemplary Embodiment—Concentric Drive Configuration 1500

As schematically depicted in FIG. 5, the second exemplary embodiment of the concentric drive configuration of the solar tracker assembly 100 of the present disclosure is shown generally at 1500. Like the first concentric drive configuration 500, the second concentric drive configuration 1500 advantageously provides for a concentric drive of the first end portions 260a, 260b of the first and second torque tube beam segments 260, 265 respectively coupled to the first and second drive journals 310, 350. As noted above, the first torque tube beam segment 260 extends along the longitudinal axis LA1 and the second torque tube beam segment 265 extends along the longitudinal axis LA2. The proximal end section 260f of the first end portion 260a of the first torque tube beam segment 260 is secured within the longitudinally extending receiver 312 of the first drive journal 310. The proximal end section 265f of the first end portion 265a of the second torque tube beam segment is secured within the longitudinally extending receiver 352 of the second drive journal 310. The intermediate section 260e of the second end portion 260b of the first torque tube beam segment 260, which is spaced from the distal end section 260d of the second end portion 260b of the first torque tube beam segment 260, is received in the torque tube beam slot 212 of the rotating bearing assembly 210 of the first bearing apparatus 202, while the distal end section 260d of the second end portion 260b of the first torque tube beam segment 260 and the proximal end section 270b of the first end portion 270a of the third torque tube beam segment 270 are secured together by the first coupler 410. Similarly, the intermediate section 265e of the second end portion 265b of the second torque tube beam segment 265, which is spaced from a distal end section 265d of the second end portion 265b of the second torque tube beam segment 265, is received in the torque tube beam slot 212 (FIG. 3) of the rotating bearing assembly 210 of the second bearing apparatus 204. The distal end section 265d of the second end portion 265b of the second torque tube beam segment 265 and the proximal end section 275b of the first end portion 275a of the fourth torque tube beam segment 275 are secured together by the second coupler 450

In the concentric drive configuration 1500, as seen in the schematic depiction of FIG. 5, the first and second torque tube beam segments 260, 265 are: a) configured in a shallow inverted V-shape or configuration V2, as viewed in side elevation (as shown in FIG. 5); and b) the axis of rotation R of the table 110 in the region of the first and second torque tube beam segments 260, 265 (schematically depicted in FIG. 5 as R1-axis of rotation of the table 110 in the region of the first torque tube beam segment 260 and R2-axis of rotation of the table 110 in the region of the second torque tube beam segment 265), when viewed in side elevation view, is substantially horizontal (parallel to the X axis and parallel to the ground G). The first end portion 260a of the first torque tube beam segment 260 is vertically above the second end portion 260b of the first torque tube beam segment 260, that is, the central longitudinal axis LA1 of the first torque tube beam segment 260 angles slightly downwardly going from the first end portion 260a at the first drive journal 310 to the second end portion 260b at the first bearing apparatus 202. The first end portion 265b of the second torque tube beam segment 265 is vertically above the second end portion 265b of the second torque tube beam segment 265, that is, the central longitudinal axis LA2 of the second torque tube beam segment 265 angles slightly downwardly going from the first end portion 265a at the second drive journal 350 to the second end portion 265b at the second bearing apparatus 204. The height of the individual support posts 140 for the slew drive 160 and the first and second bearing apparatuses 202, 204 are properly set with respect to the ground/substrate G such that the central longitudinal axes LA1, LA2 of the first and second torque tube beam segments 260, 265 are in the inverted V configuration V2. The reason for the shallow, inverted V shape or configuration V2 of torque tube beam segments 260, 265 can be explained as follows.

The axis of rotation R1 of the first torque tube beam segment 260 in a region of the second end portion 260b is defined by the first bearing apparatus 202. Specifically, the intermediate section 260e of the second end portion 260b of the first torque tube beam segment 260 passes through the torque tube beam slot 212 of the first bearing apparatus 202. The axis of rotation BA1R defined by the first bearing apparatus 202 is vertically slightly above the upper wall 252 of the first torque tube beam segment 260 in the region where the intermediate section 260e of the second end portion 260b of the first torque tube beam 260 passes through the torque tube beam slot 212. By contrast, at the opposite end of the first torque tube beam segment 260, the proximal end section 260f of the first end portion 260a is constrained by the first drive journal 310 to rotate about the longitudinal center line CLDJ1 of the first drive journal 310, which is aligned with or coincident with the axis of rotation DJ1R of the first drive journal 310 and is aligned with or coincident with the drive mechanism axis of rotation SDR, that is, the axis of rotation of the rotating drive 170 or, stated another way, the rotating drive member axis of rotation SDR. Accordingly, the first end portion 260a of the first torque tube beam segment 260 is constrained by the first drive journal 310 to rotate about the longitudinal axis LA1 of the first torque tube beam segment 260, which is aligned with the drive mechanism axis of rotation SDR, while the second end portion 260b of the first torque tube beam segment 260 is constrained by the first bearing apparatus 202 to rotate about the first bearing axis of rotation BA1R.

Since the axis of rotation BA1R defined by the first bearing apparatus 202 is vertically slightly above the upper wall 252 of the first torque tube beam segment 260 in the region where the intermediate section 260e of the second end portion 260b of the first torque tube beam segment 260 passes through the torque tube beam slot 212. The second concentric drive configuration 1500 requires that the axes of rotation R1, R2 of the first and second torque tube beam segments 260, 265 be aligned and horizontal (parallel to the X direction). This requires that the drive mechanism axis of rotation SDR and the corresponding aligned axes of rotation DJ1R, DJ2R of the first and second drive journals 310, 350 must be appropriately raised in vertical position with respect to the vertical height positions of the first and second bearing apparatuses 202, 204. Raising the vertical height of the slew drive axis of rotation SDR and the coincident first and second drive journal axes of rotation DJ1R, DJ2R requires that the slew drive 160, specifically the slew drive rotating member 170, and the first and second drive journals 310, 350 be corresponding be appropriately raised in vertical position with respect to the first and second bearing apparatuses 202, 204. The result of raising the relative vertical position of the slew drive 160 and first and second drive journals 310, 350 with respect to the vertical height positions of the first and second bearing apparatuses 202, 204 is that the first and second torque tube beam segments are necessarily angled downwardly in the inverted V configuration V2. The axes of rotation R1, R2 of the first and second torque tube beam segments 260, 265 define part of the table axis of rotation R. In addition to the first and second torque tube beam segment axes of rotation R1, R2 being aligned and horizontal, the table axis of rotation R in the region of the third torque tube beam segment 270 (as well as those torque tube beam segments (not shown) beyond the third torque tube beam segment) is also aligned and horizontal. Thus, in contrast to the first concentric drive configuration 500 in which the table axis of rotation R was an upright V configuration V1 (FIG. 4) in the region of the first and second torque tube beam segments 260, 265, in the second concentric drive configuration 1500, the table axis of rotation R is horizontal over the entire extent of the torque tube beam 250 (with the understanding or presumption that the ground/substrate G is horizontal). Stated another way, the drive mechanism axis of rotation SDR is at the same vertical height as the table axis of rotation R at the first bearing apparatus 202 (as defined by the first bearing axis of rotation BA1R) and at the second bearing apparatus 204 (as defined by the second bearing axis of rotation BA2R), that is, the table axis of rotation R is horizontal, while the first and second torque tube beam segment 260, 265 form a shallow, inverted V configuration V2 (FIG. 5).

In the second concentric drive configuration 1500, a portion of the first central longitudinal axis LA1 of the first torque tube beam segment 260 in a region of the second end portion 260b of the first torque tube beam segment 260 is vertically offset from a portion of the first central longitudinal axis LA1 of the first torque tube beam segment 260 in a region of the first end portion 260a of the first torque tube beam 260. The portion of the first central longitudinal axis LA1 of the first torque tube beam segment 260 in a region of the second end portion 260b is vertically offset from the drive mechanism axis of rotation SDR. Further, a portion of the second central longitudinal axis LA2 of the second torque tube beam segment 265 in a region of the second end portion 265b of the second torque tube beam segment 265 is vertically offset from a portion of the second central longitudinal axis LA2 of the second torque tube beam segment 265 in a region of the first end portion 265a of the second torque tube beam 265. The portion of the second central longitudinal axis LA2 of the second torque tube beam segment 265 in a region of the second end portion 265b is vertically offset from the drive mechanism axis of rotation SDR. In the second concentric drive configuration 1500, a portion of the first central longitudinal axis LA1 of the first torque tube beam segment 260 in a region of the second end portion 260b of the first torque tube beam segment 260 is offset vertically and horizontally from a portion of the first central longitudinal axis LA1 of the first torque tube beam segment 260 in a region of the first end portion 260a of the first torque tube beam 260, as the table 110 is pivoted by the rotating drive 170 of the slew drive 160 through the predetermined inclination angle range AIR of the table 110. Further, a portion of the second central longitudinal axis LA2 of the second torque tube beam segment 265 in a region of the second end portion 265b of the second torque tube beam segment 265 is offset vertically and horizontally from a portion of the second central longitudinal axis LA2 of the second torque tube beam segment 265 in a region of the first end portion 265a of the second torque tube beam 265, as the table 110 is pivoted by the rotating drive 170 through the predetermined inclination angle range AIR of the table 110.

In one exemplary embodiment, the vertical drop or offset VO (FIG. 5) of the first and second torque tube beam segments 260, 265 over the approximate 40-foot length of the first and second torque tube beam segments 260, 265 is approximately 3 inches between the respective first end portions 260a, 265a and the respective second end portions 260b, 265b. The flexibility of the first and second torque tube beam segments 260, 265 over their 40-foot lengths combined with the modest size of the vertical offset of the respective first end portions 260a, 265a and the respective second end portions 260b, 265b permits implementation of the concentric drive configuration 1500 with minimal operating issues, while obtaining the benefits and advantages of concentric drive of the solar tracker assembly 100, as noted above.

As used herein, terms of orientation and/or direction such as upward, downward, forward, rearward, upper, lower, inward, outward, inwardly, outwardly, horizontal, horizontally, vertical, vertically, distal, proximal, axially, radially, etc., are provided for convenience purposes and relate generally to the orientation shown in the Figures and/or discussed in the Detailed Description. Such orientation/direction terms are not intended to limit the scope of the present disclosure, this application and the invention or inventions described therein, or the claims appended hereto.

What have been described above are examples of the present disclosure/invention. It is, of course, not possible to describe every conceivable combination of components, assemblies, or methodologies for purposes of describing the present disclosure/invention, but one of ordinary skill in the art will recognize that many further combinations and permutations of the present disclosure/invention are possible. Accordingly, the present disclosure/invention is intended to embrace all such alterations, modifications, and variations that fall within the spirit and scope of the appended claims.

What is claimed is:

1. A solar tracker assembly comprising:
   a) a drive mechanism including a rotating drive rotating about a drive mechanism axis of rotation, the rotating drive including a first side and a second side;
   b) a table coupled to the rotating drive and pivoted by the rotating drive through a predetermined inclination angle range, the table including:
      i) a first torque tube beam segment extending along a first central longitudinal axis and having a first end portion and a second end portion spaced apart by a middle portion, a second torque tube beam segment extending along a second central longitudinal axis and having a first end portion and a second end portion spaced apart by a middle portion;
      ii) a first drive journal affixed to the first side of the rotating drive and a second drive journal affixed to the second side of the rotating drive, the first drive journal including a first receiver centered about a first longitudinal center line and receiving the first end portion of the first torque tube beam segment and the second drive journal including a second receiver centered about a second longitudinal center line and receiving the first end portion of the second torque tube beam segment, the first longitudinal center line of the first drive journal substantially coincident with the drive mechanism axis of rotation and the second longitudinal center line of the second drive journal substantially coincident with the drive mechanism axis of rotation, the first end portion of the first torque tube beam segment and the first end portion of the second torque tube beam segment rotating about the drive mechanism axis of rotation; and
      iii) a first rotatable bearing assembly of a first bearing apparatus supported for rotation about a first bearing axis of rotation and a second rotatable bearing assembly of a second bearing apparatus supported for rotation about a second bearing axis of rotation, the second end portion of the first torque tube beam segment coupled to the first rotatable bearing assembly and rotating about the first bearing axis of rotation and the second end portion of the second torque tube beam segment coupled to the second rotatable bearing assembly and rotating about the second bearing axis of rotation; and
   c) wherein the first bearing axis of rotation is vertically offset from the longitudinal center line of the first drive journal and the drive mechanism axis of rotation and the second bearing axis of rotation is vertically offset from the longitudinal center line of the second drive journal and the drive mechanism axis of rotation.

2. The solar tracker assembly of claim 1 wherein the first central longitudinal axis of the first torque tube beam segment is substantially horizontal and further wherein the second central longitudinal axis of the second torque tube beam segment is substantially horizontal.

3. The solar tracker assembly of claim 1 wherein the longitudinal center line of the first drive journal is vertically below the first bearing axis of rotation and the longitudinal center line of the second drive journal is vertically below the second bearing axis of rotation.

4. The solar tracker assembly of claim 1 wherein the longitudinal center line of the first drive journal is vertically above the first bearing axis of rotation and the longitudinal center line of the second drive journal is vertically above the second bearing axis of rotation.

5. The solar tracker assembly of claim 1 wherein the first drive journal rotates about a first drive journal axis of rotation and the second drive journal rotates about a second drive journal axis of rotation, the axes of rotation of the first and second drive journals and the drive mechanism axis of rotation being substantially coincident.

6. The solar tracker assembly of claim 5 wherein the axis of rotation of the first drive journal is vertically below the first bearing axis of rotation assembly and the axis of rotation of the second drive journal is vertically below the second bearing axis of rotation.

7. The solar tracker assembly of claim 1 wherein the first receiver of the first drive journal comprises first and second clamshell members that define a cavity extending along the longitudinal center line of the first drive journal and the second receiver of the second drive journal comprises third and fourth clamshell members that define a cavity extending along the longitudinal center line of the second drive journal.

8. The solar tracker assembly of claim 1 wherein an end portion of a third torque tube beam segment affixed is affixed by a first coupler to the second end portion of the first torque tube beam and an end portion of a fourth torque tube beam segment is affixed by a second coupler to the second end portion of the second torque tube beam, the third torque tube beam rotating about the first bearing axis of rotation and the fourth torque tube beam rotating about the second bearing axis of rotation.

9. The solar tracker assembly of claim 8 wherein the first coupler comprises first and second clamshell members that define a longitudinally extending cavity that receives the second end portion of the first torque tube beam and the end portion of the third torque tube beam and the second coupler comprises third and fourth clamshell members that define a longitudinally extending cavity that receives the second end portion of the second torque tube beam and the end portion of the fourth torque tube beam.

10. A solar tracker assembly comprising:
  a) a drive mechanism including a rotating drive rotating about a drive mechanism axis of rotation, the rotating drive including a first side and a second side;
  b) a table coupled to the rotating drive and pivoted by the rotating drive through an inclination angle range, the table including:
  i) a first torque tube beam segment extending along a first central longitudinal axis and having a first end portion and a second end portion spaced apart by a middle portion, a second torque tube beam segment extending along a second central longitudinal axis and having a first end portion and a second portion spaced apart by a middle portion;
  ii) a first drive journal affixed to a first side of the rotating drive and a second drive journal affixed to a second side of the rotating drive, the first drive journal including a first receiver receiving and securing the first end portion of the first torque tube beam segment and the second drive journal including a second receiver receiving and securing the first end portion of the second torque tube beam segment, the first receiver centered about a first longitudinal center line of the first drive journal that is substantially coincident with the drive mechanism axis of rotation and the second receiver centered about a second longitudinal center line of the second drive journal that is substantially coincident with the drive mechanism axis of rotation, the first end portion of the first torque tube beam segment and the first end portion of the second torque tube beam segment rotating about the drive mechanism axis of rotation; and
  iii) a first rotatable bearing assembly of a first bearing apparatus supported for rotation about a first bearing axis of rotation and a second bearing assembly of a second bearing apparatus supported for rotation about a second bearing axis of rotation, the second end portion of the first torque tube beam segment affixed to the first rotatable bearing assembly and rotating about the first bearing axis of rotation and the second end portion of the second torque tube beam segment affixed to the second rotatable bearing assembly and rotating about the second bearing axis of rotation; and
  c) wherein a portion of the first central longitudinal axis of the first torque tube beam segment in a region of the second end portion of the first torque tube beam segment is vertically offset from a portion of the first central longitudinal axis of the first torque tube beam segment in a region of the first end portion of the first torque tube beam and is vertically offset from the drive mechanism axis of rotation and further wherein a portion of the second central longitudinal axis of the second torque tube beam segment in a region of the second end portion of the second torque tube beam segment is vertically offset from a portion of the second central longitudinal axis of the second torque tube beam segment in a region of the first end portion of the second torque tube beam and is vertically offset from the drive mechanism axis of rotation.

11. The solar tracker assembly of claim 10 wherein the first bearing axis of rotation is substantially coincident with the first longitudinal center line of the first drive journal and the second bearing axis of rotation is substantially coincident with the second longitudinal center line of the second drive journal.

12. The solar tracker assembly of claim 10 wherein, as the table is pivoted by the rotating drive through the predetermined inclination angle range of the table, a portion of the first central longitudinal axis of the first torque tube beam segment in a region of the second end portion of the first torque tube beam segment moves throughout an arcuate path that includes both horizontal and vertical movement about the first bearing axis of rotation and a portion of the second central longitudinal axis of the second torque tube beam segment in a region of the second end portion of the second torque tube beam segment moves throughout an arcuate path that includes both horizontal and vertical movement about the second bearing axis of rotation.

13. The solar tracker assembly of claim 10 wherein the longitudinal center line of the first drive journal is vertically aligned with the first bearing axis of rotation and the longitudinal center line of the second drive journal is vertically aligned with the second bearing axis of rotation.

14. The solar tracker assembly of claim 10 wherein the first drive journal rotates about a first drive journal axis of rotation and the second drive journal rotates about a second drive journal axis of rotation, the axes of rotation of the first and second drive journals and the drive mechanism axis of rotation being substantially coincident.

15. The solar tracker assembly of claim 14 wherein the axis of rotation of the first drive journal is vertically aligned with the first bearing axis of rotation assembly and the axis of rotation of the second drive journal is vertically aligned with the second bearing axis of rotation.

16. The solar tracker assembly of claim 10 wherein the first receiver of the first drive journal comprises first and second clamshell members that define a cavity extending along the longitudinal center line of the first drive journal and the second receiver of the second drive journal comprises third and fourth clamshell members that define a cavity extending along the longitudinal center line of the second drive journal.

17. The solar tracker assembly of claim 10 wherein an end portion of a third torque tube beam segment affixed is affixed by a first coupler to the second end portion of the first torque tube beam and an end portion of a fourth torque tube beam segment is affixed by a second coupled to the second end portion of the second torque tube beam, the third torque tube beam rotating about the first bearing axis of rotation and the fourth torque tube beam rotating about the second bearing axis of rotation and further wherein the first coupler comprises first and second clamshell members that define a longitudinally extending cavity that receives the second end portion of the first torque tube beam and the end portion of the third torque tube beam and the second coupler comprises third and fourth clamshell members that define a longitudinally extending cavity that receives the second end portion of the second torque tube beam and the end portion of the fourth torque tube beam.

18. A solar tracker assembly comprising:
  a) a drive mechanism including a rotating drive rotating about a drive mechanism axis of rotation, the rotating drive including a first side and a second side;
  b) a table coupled to the rotating drive and pivoted by the rotating drive through a predetermined inclination angle range, the table including:
    i) a first torque tube beam segment extending along a first central longitudinal axis and having a first end portion and a second end portion spaced apart by a middle portion, a second torque tube beam segment extending along a second central longitudinal axis and having a first end portion and a second end portion spaced apart by a middle portion;
    ii) a first drive journal affixed to the first side of the rotating drive and a second drive journal affixed to the second side of the rotating drive, the first drive journal including a first receiver centered about a first longitudinal center line and receiving the first end portion of the first torque tube beam segment and the second drive journal including a second receiver centered about a second longitudinal center line and receiving the first end portion of the second torque tube beam segment, the first longitudinal center line of the first drive journal substantially coincident with the drive mechanism axis of rotation and the second longitudinal center line of the second drive journal substantially coincident with the drive mechanism axis of rotation, the first end portion of the first torque tube beam segment and the first end portion of the second torque tube beam segment rotating about the drive mechanism axis of rotation; and
    iii) a first rotatable bearing assembly of a first bearing apparatus supported for rotation about a first bearing axis of rotation and a second rotatable bearing assembly of a second bearing apparatus supported for rotation about a second bearing axis of rotation, the second end portion of the first torque tube beam segment coupled to the first rotatable bearing assembly and rotating about the first bearing axis of rotation, and the second end portion of the second torque tube beam segment coupled to the second rotatable bearing assembly and rotating about the second bearing axis of rotation; and
  c) wherein the first central longitudinal axis of the first torque tube beam segment in a region of the second end portion of the first torque tube beam is vertically offset from the first bearing axis of rotation and the second longitudinal axis of the second torque tube beam segment in a region of the second end portion is vertically offset from the second bearing axis of rotation.

19. The solar tracker assembly of claim 18 wherein the longitudinal center line of the first drive journal is vertically below the first bearing axis of rotation and the longitudinal center line of the second drive journal is vertically below the second bearing axis of rotation.

20. The solar tracker assembly of claim 18 wherein the longitudinal center line of the first drive journal is vertically above the first bearing axis of rotation and the longitudinal center line of the second drive journal is vertically above the second bearing axis of rotation.

21. The solar tracker assembly of claim 18 wherein the first drive journal rotates about a first drive journal axis of rotation and the second drive journal rotates about a second drive journal axis of rotation, the axes of rotation of the first and second drive journals and the drive mechanism axis of rotation being substantially coincident.

22. The solar tracker assembly of claim 21 wherein the axis of rotation of the first drive journal is vertically below the first bearing axis of rotation assembly and the axis of rotation of the second drive journal is vertically below the second bearing axis of rotation.

23. The solar tracker assembly of claim 21 wherein the axis of rotation of the first drive journal is vertically above the first bearing axis of rotation assembly and the axis of rotation of the second drive journal is vertically above the second bearing axis of rotation.

* * * * *